US012580496B1

(12) United States Patent　　　　　　(10) Patent No.:　US 12,580,496 B1

Scheuerell et al.　　　　　　　　　　　(45) Date of Patent:　Mar. 17, 2026

(54) FOUR QUADRANT PARALLELING CONTROL FOR INVERTERS

(71) Applicant: Cummins Power Generation Inc., Minneapolis, MN (US)

(72) Inventors: Michael James Scheuerell, Stillwater, MN (US); Oliver Daniel Wilson, Elk River, MN (US); Wangwei Zhou, Shoreview, MN (US); Denise Maria Christine Athaide, Minneapolis, MN (US); Timothy M. Lewis, Minneapolis, MN (US); Aidar Zhetessov, Madison, WI (US)

(73) Assignee: Cummins Power Generation Inc., Minneapolis, MN (US)

( * ) Notice: Subject to any disclaimer, the term of this patent is extended or adjusted under 35 U.S.C. 154(b) by 180 days.

(21) Appl. No.: 18/243,423

(22) Filed: Sep. 7, 2023

Related U.S. Application Data

(63) Continuation of application No. 18/131,304, filed on Apr. 5, 2023, now abandoned.

(51) Int. Cl.
　　　*H02M 7/5387*　　(2007.01)
　　　*H02J 3/00*　　　(2006.01)
　　　*H02M 1/00*　　　(2006.01)
　　　*H02M 1/12*　　　(2006.01)

(52) U.S. Cl.
　　　CPC ........... H02M 7/53871 (2013.01); H02J 3/00 (2013.01); H02M 1/0003 (2021.05); *H02M 1/126* (2013.01)

(58) Field of Classification Search
　　　CPC ........... H02M 7/53871; H02M 1/0003; H02M 1/126; H02J 3/00
　　　USPC .......................................................... 307/24
　　　See application file for complete search history.

(56) References Cited

U.S. PATENT DOCUMENTS

| 4,356,403 | A | 10/1982 | Mohat |
| 9,042,141 | B2 | 5/2015 | Yu et al. |
| 2020/0321880 | A1 | 10/2020 | Lee et al. |
| 2022/0224113 | A1 | 7/2022 | Schmidt |
| 2023/0283083 | A1* | 9/2023 | Manjrekar .............. H02J 3/381 |
| | | | 307/82 |

FOREIGN PATENT DOCUMENTS

| WO | WO-2015/070602 A1 | 5/2015 |
| WO | WO-2018/127576 A1 | 7/2018 |

* cited by examiner

*Primary Examiner* — Richard Tan

(74) *Attorney, Agent, or Firm* — Foley & Lardner LLP

(57) ABSTRACT

Presented herein are systems, devices, and methods for parallel control. A device may monitor for a transition in a first power signal corresponding to electrical power conveyed between an inverter and an electric bus. The device may identify, responsive to detecting the transition in the first power signal, a frequency in accordance with the transition in the first power signal and a frequency droop slope and a voltage in accordance with the transition and an amplitude droop slope. The device may modify the first power signal using the frequency and the voltage to generate a second power signal to maintain the power. The device may convey the electrical power between the inverter and the electric bus.

20 Claims, 13 Drawing Sheets

1400

Charging

FOUR QUADRANT PARALLELING CONTROL FOR INVERTERS

CROSS-REFERENCE TO RELATED APPLICATIONS

This application is a continuation of U.S. patent application Ser. No. 18/131,304, filed Apr. 5, 2023, the disclosure of which is incorporated by reference herein in its entirety.

TECHNICAL FIELD

The present disclosure relates generally to power systems, and in particular systems and methods of parallel control for inverters.

BACKGROUND

A power system can accept or relay electrical power from various power sources to one or more components electrically coupled therewith. To convey electrical power, the power system can convert the power from direct current (DC) to alternating current (AC), and vice-versa.

SUMMARY

The present disclosure relates to techniques for paralleling control for inverters. A controller for an inverter may monitor for transients in an active and reactive power components of alternating current (AC) electric power between an inverter and an output electric bus. With the detection, the controller may use a synchronous reference frame (SRF) phase lock loop (PLL) to regulate a voltage component (Vinv_q) of the electric power by setting the component to a defined value (e.g., 0) to maintain a phase of another voltage component (e.g., Vinv_d). To facilitate power flow between the inverter and an AC power source (e.g., a genset, another inverter, a grid simulator, or utility grid), the controller may use a frequency and amplitude droop control along with AC voltage and current controls. When discharging onto the load, the controller may droop the frequency and voltages of the electric power in accordance with the frequency droop slope (e.g., P/F slope) and amplitude droop slope (e.g., Q/V slope) respectively. Conversely, when charging from or discharging to the live electric bus, the controller may change a center frequency and center voltage of the electric power to initiate charging of power flow P (kW) according to the frequency droop slope and the voltage droop slope respectively.

At least one aspect is directed to a device for parallel control. The device may include a computer-readable medium having instructions stored thereon. The device may include at least one processor configured to execute the instructions. The at least one processor may monitor for a transition in a first power signal corresponding to electrical power conveyed between an inverter and an electric bus, the first power signal having a power and a first frequency. The at least one processor may identify, responsive to detecting the transition in the first power signal, a second frequency in accordance with the transition in the first power signal and a frequency droop slope. The, at least one, processor may modify the first power signal using the second frequency to generate a second power signal to maintain the power. The, at least one, processor may convey the electrical power between the inverter and the electric bus.

In some embodiments, the, at least one, processor may identify, responsive to identifying the transition as an initiation of discharging onto the electric bus, a first voltage for the second power signal in accordance with a voltage droop slope. In some embodiments, the at least one processor may modify the first power signal to maintain the first frequency and the voltage at a point of common coupling (PCC) between the inverter and the electric bus to generate the second power signal.

In some embodiments, the, at least one, processor may determine, responsive to identifying the transition as an initiation of charging from the load, a voltage for the second power signal to maintain the power. In some embodiments, the at least one processor may modify the first power signal to change the first frequency to the third frequency and the voltage to generate the second power signal for the charging from the electric bus.

In some embodiments, the, at least one, processor may identify a voltage component from a plurality of voltage components corresponding to a voltage of the first power signal. In some embodiments, the, at least one, processor may set the voltage component to a defined value to maintain a phase of the electrical power.

In some embodiments, the at least one processor may identify, responsive to identifying the transition as a coupling of a second power source parallel to the inverter, the second frequency to match the electric power from the second power source. In some embodiments, the at least one processor may modify the first power signal to change the first frequency to the second frequency to generate the second power signal for conveyance of the electrical power between the inverter and the electric bus.

In some embodiments, the at least one processor may identify, responsive to identifying the transition as a coupling of a second power source parallel to the inverter, a voltage to match the electric power from the second power source. In some embodiments, the at least one processor may modify the first power signal to set the voltage to generate the second power signal for conveyance of the electrical power between the inverter and the electric bus. In some embodiments, the at least one processor may monitor for the transition comprising at least one of: charging from the electric bus, discharging onto the electric bus, or a coupling of a power source parallel to the inverter.

At least one other aspect of the present disclosure is directed to a system for providing electrical power. The system may include a power source configured to provide electrical power. The system may include an inverter structured to be coupled with the power source to convey the electrical power to an electric bus. The system may include a power meter structured to be coupled with the inverter and the electric bus. The power meter configured to identify a first power signal of the electrical power having a power and a voltage. The system may include an amplitude droop control structured to be coupled with the power meter. The amplitude droop control may determine, responsive to a transition in the first power signal, a second voltage in accordance with an amplitude droop slope. The system may include a supervisory control structured to be coupled with the amplitude droop control and the inverter. The supervisory control may modify the first power signal using the second voltage to generate a second power signal to maintain the power to provide to the electric bus.

In some embodiments, the system may include a frequency droop control structured to be coupled with the power meter and the supervisory control. The frequency droop control may be parallel to the amplitude droop control relative to the supervisory control. The frequency droop control may determine, responsive to the transition, a frequency in accordance with a frequency droop slope. In some embodiments, the supervisory control is structured to be coupled with the frequency droop control. The supervisory control may determine a center frequency to modify the frequency of the first power signal to maintain the power.

In some embodiments, the power meter may determine, from the first power signal, an active power component and a reactive power component. In some embodiments, the power meter may provide the reactive power component to the amplitude droop control and the active power component to a frequency droop control.

In some embodiments, the system may include a phase control configured to set a voltage component of a plurality of voltage components corresponding to the first power signal, to null to maintain a phase of the electrical power. In some embodiments, the system may include a phase control configured to modify the first power signal using a frequency determined in accordance with a frequency droop slope, to generate the second power signal to maintain a phase of the electrical power.

In some embodiments, the power meter may determine, responsive to the transition, a type of the transition as one of charging from the electric bus, discharging onto the electric bus, or a coupling of a parallel power source. In some embodiments, the supervisory control is further configured to modify the first power signal to generate the second power signal based on the type of the transition. In some embodiments, the power source may include at least one of a battery pack, a generator set, a renewable energy source, a microgrid, a power interface coupled with an external component.

At least one other aspect of the present disclosure is directed to a method of regulating electrical power. A processor may identify a change in a first power signal corresponding to electrical power conveyed between an inverter and an electric bus. The processor may calculate, responsive to the change, a center frequency of the first power signal for a frequency droop control. The processor may generate a second power signal using the first power signal and the center frequency in accordance with the frequency droop control to maintain the electrical power. The processor may provide the second power signal to the inverter to convey electrical power between the inverter and the electric bus.

In some embodiments, the processor may calculate, responsive to identifying the change as a start of charging from the electric bus, a center voltage in accordance with an amplitude droop sloop. In some embodiments, the processor may generate the second power signal to maintain the center frequency and the center voltage for the electrical power.

In some embodiments, the processor may calculate, responsive to identifying the change as a start of discharging onto the electric bus, a center voltage for an amplitude droop control. In some embodiments, the processor may generate the second power signal to change the center frequency and the center voltage for the electrical power.

In some embodiments, the processor may calculate, responsive to identifying the change as a coupling of a parallel power source on the electric bus, a center frequency and a center voltage to match the electric power from the parallel power source. In some embodiments, the processor may generate second power signal based on the center frequency and the center voltage.

In some embodiments, the processor may identify, from the first power signal, an active power component and a reactive power component. In some embodiments, the processor may generate the second power signal using the reactive power component modified in accordance with an amplitude droop slope and the active power component modified in accordance with the frequency droop control. In some embodiments, the processor may monitor for the change corresponding to at least one of: charging from the electric bus, discharging onto the electric bus, or a coupling of the other power source parallel to the inverter.

It is to be understood that both the foregoing general description and the following detailed description are exemplary and explanatory only, and are not restrictive of the present teachings.

BRIEF DESCRIPTION OF THE DRAWINGS

The disclosure will become more fully understood from the following detailed description, taken in conjunction with the accompanying figures, wherein like reference numerals refer to like elements unless otherwise indicated, in which.

DETAILED DESCRIPTION

Figure 1:
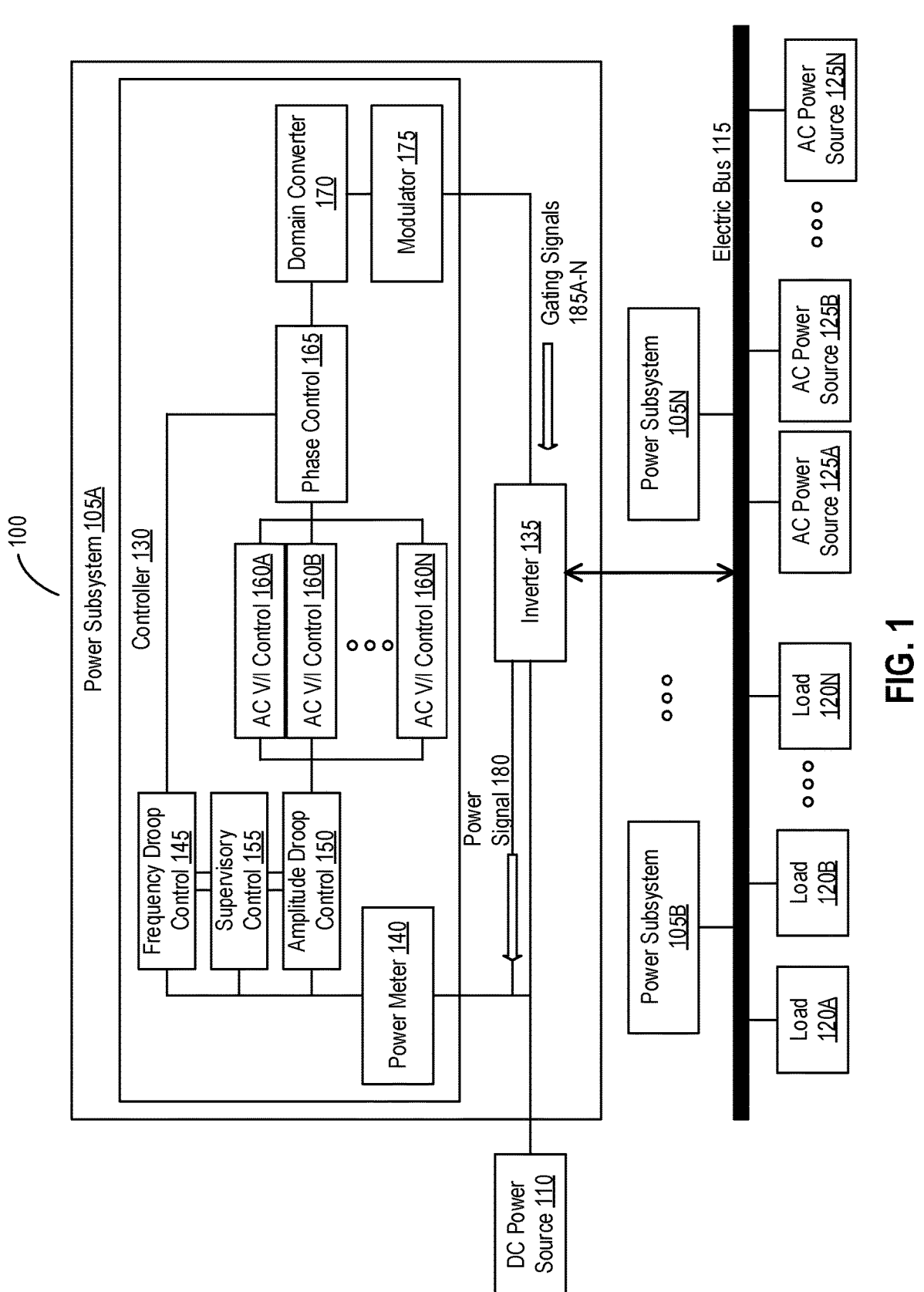
FIG. 1 depicts a block diagram of a system for paralleling control in accordance with an illustrative embodiment.

Following below are more detailed descriptions of various concepts related to, and implementations of, systems, methods, apparatuses, and devices for parallel control in power systems. The various concepts introduced above and discussed in greater detail below may be implemented in any of a number of ways, as the described concepts are not limited to any particular manner of implementation. Examples of specific implementations and applications are provided primarily for illustrative purposes.

A power subsystem can convey electrical power between a power source (e.g., a battery, generator set, a renewable power plant, or mixed fuel source) and one or more loads or components via an electric bus electrically coupled with the power source. A power subsystem containing a controller and a power inverter may be electrically coupled between the power source and the electrical bus to facilitate conveyance of electrical power. The power inverter may perform direct current (DC) to alternating current (AC) (DC/AC) conversion on the electrical power between the power source and the load. The controller may configure the power inverter based on a mode of operation of the power subsystem. When under a stand-alone mode (also referred herein as a grid-forming mode), the controller may define various characteristics of the output electric power, such as voltage amplitude, frequency, and phase, on the electric bus. Conversely, when under a parallel mode (also referred herein as a grid-following mode), the controller may modify the output voltage via the power subsystem to match the characteristics of the voltage on the electric bus.

While this architecture can convey electrical power between the power source and the electric bus, the power subsystem when coupled in parallel with multiple instances of power subsystems relative to the electric bus may suffer from instability. The issue of instability in paralleling control may be especially problematic when switching between the stand-alone mode and grid-following mode. The transition may bring about a transient on at least one of the power subsystems, resulting in mismatching amplitudes, frequencies, and phases of the electric power through the power subsystem and the electric bus. The instability and other deficiencies may also arise with power sharing, discharging, or charging in the parallel context and source switching at a power subsystem. Furthermore, the power subsystems in parallel with one another may not be in communication with one another. The lack of any communication may make coordination among the power subsystems to provide stable electric power on the common bus difficult, if not impossible, further exacerbating the issue.

One approach to addressing these problems may entail an inclusion of a virtual impedance component between the power source and the load in the power subsystem. The virtual impedance component may include a low pass filter to suppress burst or unstable electrical power output. The inclusion of a physical impedance component, however, may result in additional hardware leading to higher bulkiness and increased complexity to the power subsystem. In addition, the addition of a virtual impedance component may be able to reduce the bulkiness, but the filter in such a component may be susceptible to sensitivity to tuning inputs. Another approach aimed at addressing the issue with output power stability may involve the use of a switch between a grid-forming and grid-following configuration for the power subsystem. But this approach may be limited in scenarios where the electric bus is already stable and controlled.

To these and other technical challenges, the controller may monitor for transients in an active and reactive power components of alternating current (AC) electric power between an inverter and an output electric bus. With the detection, the controller may use a synchronous reference frame (SRF) phase lock loop (PLL) to regulate a voltage component ($vq$) of the electric power by setting the component to a defined value (e.g., 0) to maintain a phase of another voltage component (e.g., $vd$). To facilitate power flow between the inverter and an AC power source (e.g., a genset, another inverter, grid simulator, or utility grid), the controller may use a frequency and amplitude droop control along with AC voltage and current controls. When discharging onto the load, the controller may droop the frequency and voltages of the electric power in accordance with the frequency droop slope (e.g., P/F slope) and amplitude droop slope (e.g., Q/V slope) respectively. Conversely, when charging from or discharging to the live electric bus, the controller may change a center frequency and center voltage of the electric power to initiate power flow (charging or discharging) of active power P (kW) and reactive power Q (kVAr) according to the frequency droop slope and the voltage droop slope respectively.

In this manner, the power subsystem may achieve live and dead bus start-up in a quicker initiation time, starting with a closed AC contactor, without the installation of additional instrumentation (e.g., AC voltage sensors). For the power subsystem, the high-voltage direct current (HVDC) electric bus may have half the established voltage, reducing the DC-DC dual active bridge (DAB) converter start-up time. Furthermore, the controller may enable bidirectional four quadrant power flow via the power subsystem including the inverter (e.g., charging and discharging both active and reactive power flow). The droop control for active power and reactive power flow may be used for active power (kW) sharing and reactive power (kVAr) sharing with power sources (e.g., gensets).

Continuing on, the power subsystem with the controller may provide for various configurations of paralleling control, such as: multi-source AC paralleling; inverter-inverter paralleling on the bus; power sharing and charging (e.g., with inverters of equal or different ratings); inverter-grid simulation (or utility and grid) paralleling, charging, and discharging; inverter-power source (e.g., genset) paralleling and charging, among others. The power subsystem may also enable source switching capabilities, such as: an inverter changing from charging to discharging, and vice versa, in a dynamic manner. The power subsystem may be free from reliance on mode transitions, islanding, and reconnection schemes.

In addition, this architecture for the power subsystem may provide for master-less control without reliance on communication among the power subsystems, state machine, or a central supervisory control unit. The power subsystem may achieve seamless transitions between charging and discharging and phase angle synchronization, without the involvement of control mode transitions. The same control scheme may be used for standalone, inverter paralleling scenario, genset or grid paralleled charging and discharging. The power subsystem may also enable capacitive load handling, with opposite or negative droop slops handling capacitive loads for applications with leading power factor (negative kVAr/capacitive) loads (e.g., data centers, uninterruptable power supply (UPS), etc.). Moreover, the power subsystem may provide for a secondary control layer for voltage, frequency, active power, and reactive power control loops to regulate a center frequency and a center voltage for power flow control.

Furthermore, the power subsystem may be able to use all four quadrants of power, such as positive reactive, negative reactive, positive active, and negative active powers. Other entities may use the inverter readily by commanding power flow, because the supervisory control and droop control layers work together making the inverter more user friendly and easy to integrate into other systems. The supervisory control within the controller may be integrated into an inner control layer, being less complex than other techniques. The power subsystem may also operate using automated source switching, not islanding modes.

Referring now to FIG. 1, depicted is a block diagram of an environment or a system 100 for paralleling control. In brief overview, the system 100 may include one or more power subsystems 105A-N (hereinafter generally referred to as power subsystems 105), at least one direct current (DC) power source 110, at least one electric bus 115, one or more loads 120A-N (hereinafter generally referred to as loads 120), and one or more alternating current (AC) power sources 125A-N (hereinafter generally referred to as power sources 125), among others. At least one power subsystem 105 (e.g., the power subsystem 105A as depicted) may be structured to be electrically coupled with the DC power source 110. The power subsystem 105 may include at least one controller 130 and at least one inverter 135. The controller 130 (sometimes herein referred to as a control, a control unit, or a device) may include at least one power meter 140, at least one frequency droop control 145, at least one amplitude droop control 150, at least one supervisory control 155, one or more AC voltage-current (V/I) controls 160A-N (hereinafter generally referred to as AC V/I control 160), at least one phase control 165, at least one domain converter 170, and at least one modulator 175, among others.

Components of the power subsystem 105, such as the controller 130 can be implemented using circuitry. The circuitry can include logic or machine-readable instructions to define the behavior, functions, and operations of the controller 125. The circuitry may be implemented by computer readable media which may include code written in any programming language including, but not limited to, Java, JavaScript, Python or the like and any conventional procedural programming languages, such as the "C" programming language or similar programming languages.

The processors in the power subsystem 105 can communicate with one or more remote processors. The remote processors may be connected to each other through any type of network (e.g., a CAN bus, etc.). The memory (e.g., RAM, ROM, Flash Memory, hard disk storage, etc.) may be a computer-readable medium to store data or computer code for facilitating the various processes described herein. The memory may be communicably connected to the processing circuitry to provide computer code or instructions for executing at least some of the processes described herein. The memory may be or include tangible, non-transient volatile memory or non-volatile memory and may include database components, object code components, script components, or any other type of information structure for supporting the various activities and information structures described herein.

The DC power source 110 can generate, output, or otherwise provide electrical power. The DC power source 110 can include or correspond to any source of the electrical power for the system 100. The DC power source 110 may include, for example, a generator set, a microgrid, a renewable energy source (e.g., a photovoltaic array, a generator coupled with hydraulic turbine, or a wind power generator), a modular reactor, a power station, or a power interface coupled with an external power component, among others. In some embodiments, the DC power source 110 may include energy storage (e.g., batteries, fuel cells) coupled with a DC-DC power electronic converter. The DC power source 110 can be structured to be electrically coupled with the power subsystem 105 (e.g., via a bus or connector). The DC power source 110 can be electrically coupled with the electrical bus 115 (e.g., via the controller 130 of the power subsystem 105) to convey, send, or otherwise deliver the electrical power. In the depicted example, the DC power source 110 may deliver the electrical power to the controller 130 and the inverter 135 in the power subsystem 105.

The electrical power provided by the DC power source 110 to the power subsystem 105 (or another electrically coupled component) can be direct current (DC) power. For example, the DC power source 110 may also be a wind power generator to produce DC power to the power subsystem 105. In some embodiments, the DC power source 110 may be part of the same apparatus, device, or component as the power subsystem 105. In some embodiments, the DC power source 110 may be separate from the power subsystem 105. For example, the power subsystem 105 can be physically separate from the DC power source 110 and be electrically coupled with the DC power source 110 via an electrical bus connection.

The AC power source 125 can generate, output, or otherwise provide electrical power. The AC power source 125 can include or correspond to any source of the electrical power for the system 100. The AC power source 125 may include, for example, a generator set, a microgrid, a renewable fuel source (e.g., a photovoltaic array, a generator coupled with hydraulic turbine, or a wind power generator), a modular reactor, a power station, or a power interface coupled with an external power component, among others. In some embodiments, the AC power source 125 may include energy storage (e.g., batteries, fuel cells) coupled with a DC-AC power electronic converter. The AC power source 125 can be structured to be electrically coupled with the electric bus 115 to convey, send, or otherwise provide AC power thereon. The electrical power provided by the AC power source 125 (or another electrically coupled component) can be AC power. For instance, the AC power source 125 may be a generator set to produce AC power to the electric bus 115.

Each power subsystem 105 may be structured to be coupled with at least one of the power sources 110. Each power subsystem 105 may be structured to be coupled with the electric bus 115 in parallel with at least one other power subsystem 105. For instance, the power subsystem 105A and the power subsystem 105B may be electrically connected in parallel with the electric bus 115. The power subsystem 105 may convey or pass the electrical power between the DC power source 110 and the electric bus 115 (and the loads 120 via the electrical bus 115). When the DC power source 110 is discharging to one of the loads 120 coupled with the electric bus 115, the power subsystem 105 may accept, obtain, or otherwise receive the electrical power drawn from the DC power source 110. Conversely, when charging from one of the components (e.g., the AC power source 125 or another power subsystem 105) on the electric bus 115, the power subsystem 105 may accept, obtain, or otherwise the electrical power from the external source to be directed to charge a power storage (e.g., batteries of the DC power source 110).

The power subsystem 105 and the coupled DC power source 110 may initially be disconnected from the electrical bus 115. The functionality of the power subsystem 105 and the components therein (e.g., the controller 125) may depend on whether the power subsystem 105 is charging or discharging. When the power subsystem 105 is discharging, the power subsystem 105 may perform operations to droop the frequency in accordance with a frequency droop slope (active power (P) to frequency (F) droop slope) and the voltage in accordance with an amplitude droop slope (reactive power (Q) to voltage (V) droop slope). In addition, the power subsystem 105 may change a center frequency and center voltage to maintain the frequency and the voltage at a point of common coupling (PCC) with the electric bus 115. On the other hand, when the power subsystem 105 is charging, the power subsystem 105 may perform operations to change a center voltage and center frequency to initiate charging power flow (e.g., active power (P)) in accordance with the amplitude droop slope and the frequency droop slope respectively. The functionalities of the power subsystem 105 and the components therein are detailed herein below.

In the power subsystem 105, the inverter 135 (sometimes herein referred to as a power inverter or rectifier) may convey the electrical power between the DC power source 110 and the electrical bus 115. The inverter 135 may be structured to be coupled with the DC power source 110 and the electrical bus 115. The inverter 135 may also be structured to be coupled with the controller 130 in the power subsystem 105. The inverter 135 may obtain, accept, or otherwise receive the DC electric power from the DC power source 110. The inverter 135 may include a set of legs corresponding to a set of components in a domain. For example, the inverter 135 can include four legs, three for A-phase, B-phase, and C-phase and the remaining fourth for a reference signal. While primarily described as having three or four legs in the present disclosure, the inverter 135 may include any number of legs.

The inverter 135 may transform or convert the DC electrical power from the DC power source 110 DC to AC. The inverter 130 can include one or more components, such as an inverter and rectifier, and any combination thereof, to perform the DC to AC conversion. In some embodiments, the inverter 130 can transform the electrical power from AC on the electric bus 115 to DC. As discussed above, the electrical power may be passed through the power subsystem 105 in either direction. The inverter 135 may be electrically coupled between the DC power source 110 and the electric bus 115 in series configuration (e.g., as depicted) or parallel, or in any combination. The inverter 135 may be electrically coupled with the electric bus 115 in parallel with another power subsystem 105 (e.g., as depicted).

In the controller 130, the power meter 140 executing on the controller 130 may acquire, obtain, or otherwise identify at least one power signal 180. The power meter 140 may be structured to be coupled with the inverter 135 and the DC power source 110, among others. The power signal 180 may correspond to the AC electric power between the inverter 135 and the electric bus 115. The power signal 180 may be defined in terms of or otherwise have a voltage (V), a current (I), power (V×I), frequency (f), and a phase (Θ), among others. The AC electric power between the inverter 135 and the electric bus 115 may be a resultant of a conversion of the DC electric power from the DC power source 110 to the AC power as performed by the inverter 135. The power signal 180 may have a set of components (e.g., voltage or current) defined in a domain (e.g., direct (D), quadrature (Q) zero (Z or 0) (dq0) domain or ABC domain). For example, the power signal 180 may be defined by voltage and current for A-phase, B-phase, and C-phase components in the ABC domain.

In some embodiments, the power meter 140 may transform, translate, or convert the power signal 180 from one domain to another domain. The power meter 140 may select or identify a target domain (e.g. dq0 domain) to which to convert the power signal 180. With the identification, the domain converter 170 may perform the domain transformation from the original domain to the target domain. In performing, the power meter 140 may calculate, generate, or otherwise determine the value for each component in the set of components in the target domain for the power signal 180. The power signal 180 in the target domain may include a value for each component (e.g., direct (d), quadrature (q), and zero (0) components in the dq0 domain).

The power meter 140 may calculate, generate, or otherwise determine the power signal 180 for the AC electric power outputted by the inverter 135 from converting the DC to AC conversion of the DC electric power from the DC power source 110. The power meter 140 may measure, instrument, or otherwise identify a voltage, a current, a frequency, or a phase for each voltage and the current of the AC electric power from the inverter 135. Based on the measured voltage, current, and frequency, or phase, the power meter 140 may determine the power signal 180. In some embodiments, the power meter 140 may acquire, identify, or measure a voltage and a frequency at a point of common coupling (PCC) between the inverter 135 and the electric bus 115. The voltage and the frequency at the PCC may correspond to the respective values measured at a point in a connection between the inverter 135 (and by extension the power subsystem 105) and other components coupled with the electric bus 115 (e.g., the other power subsystems 105, loads 120, or AC power sources 125). With the determination, the power meter 140 may forward, send, or otherwise provide the power signal 180 to the frequency droop control 145, the amplitude droop control 150, and the supervisory control 155, among others.

The power meter 140 may calculate, identify, or otherwise determine an active power component (P) and a reactive power component (Q) from the power signal 180. The active power component may correspond to a real component of the AC electric power corresponding to a product of the voltage and a component of the current in phase with the voltage. The reactive power component may correspond to an imaginary component of the AC electric power corresponding to a product of the voltage and a component of the current out of phase with the voltage. In some embodiments, the power meter 140 may calculate, identify, or otherwise determine a commanded active power component (P*) and a commanded reactive power component (Q*) from the power signal 180. The commanded active power component and the commanded reactive power component may correspond to values of the power components inputted into the inverter 135 to direct the output of the electrical power via the inverter 135. The power meter 140 may relay, send, or otherwise provide the reactive power component to the amplitude droop control 150 and the active power component to the frequency droop control 145.

With the identification, the power meter 140 may check, scan, or monitor for at least one transient (sometimes herein referred to as a transition or change) in the power signal 180.

The transient may by extension be in AC electric power conveyed between the inverter 135 and the electric bus 115. The transient may correspond to: (i) charging to draw the AC electric power from the electric bus 115 to convert via the inverter 135 and to store at the DC power source 110; (ii) discharging to output the AC electric power from the DC power source 110 via the inverter 135 onto the electric bus 115; and (iii) coupling (or uncoupling) of another instance of the power subsystem 105 or AC power source 125 onto the electric bus 115, among others. In some embodiments, the power meter 140 may monitor for the transient in the active power component and the reactive power component of the power signal 180.

To monitor for the transient, the power meter 140 may determine whether at least one value in the power signal 180 changes by a threshold amount within a defined amount of time. For example, the change for the trainset may correspond to an increase or decrease in voltage, current, frequency, power value (e.g., active or reactive power component) or phase over a threshold amount within an amount of time (e.g., milliseconds). If the value of the power signal 180 does not change by the threshold amount within the amount of time, the power meter 140 may detect the absence of any transient within the power signal 180. Otherwise, if any value in the power signal 180 changes by the threshold amount within the amount of time, the power meter 140 may detect the occurrence of the transient within the power signal 180.

In some embodiments, the power meter 140 may identify or determine whether the power subsystem 105 is charging from the electric bus 115 or discharging the DC power source 110, when the transient is detected in the power signal 180. To determine, the power meter 140 may calculate, determine, or otherwise identify a direction (or sign) of the change in the value of the power signal 180. When the change in value (e.g., power value) is positive, the power meter 140 may determine that the discharging is occurring via the power subsystem 105. For instance, the power meter 140 may determine that the DC power source 110 is discharging electric power via the inverter 135 onto the electric bus 115, when the change in the active power component is positive. Conversely, when the change in value (e.g., power value) is negative, the power meter 140 may determine that the charging is occurring via the power subsystem 105. For instance, the power meter 140 may determine that the DC power source 110 is charging and drawing the electric power via the inverter 135 from the electric bus 115, when the change in the active power component is negative.

In some embodiments, the power meter 140 may sense, determine, or identify whether the power subsystem 105 (and by extension the DC power source 110) is operating as a standalone or parallel on the electric bus 115. The standalone operations may correspond to the power subsystem 105 being the only instance of the power subsystem 105 electrically coupled with the electric bus 115, with no other AC power sources (e.g., other power subsystems 105 or AC power sources 125). In contrast, the parallel operations may correspond to the power subsystem 105 being electrically coupled with the electric bus 115 in parallel with other instances of power subsystems 105 and AC power sources 125). For example, the parallel operations may include charging of the power subsystem 105 via the electric bus 115 from the AC power source 125 or another power subsystem 105 connected in parallel. The parallel operation may also include discharging from the power subsystem 105 via the electric 105 onto the AC power source 125 or another subsystem 105 connected in parallel.

The frequency droop control 145 executing on the controller 130 may retrieve, receive, or otherwise identify at least a portion of the power signal 180 from the power meter 140. The frequency droop control 145 may be structured to be coupled with the power meter 140, in parallel with the amplitude droop control 150 in the controller 130. In some embodiments, the frequency droop control 145 may process the received power signal 180. The frequency droop control 145 may receive or identify the active power component of the power signal 180 from the power meter 140. For instance, the active power component of the power signal 180 may be a measured inverter output active power converted into per unit (pu). Upon receipt, the frequency droop control 145 may calculate, determine, or otherwise identify an initial frequency of the voltage of the power signal 180, such as the initial frequency of the AC voltage.

The frequency droop control 145 may calculate, identify, or otherwise determine a drooped frequency for the voltage of the power signal 180 using the initial frequency according to a frequency droop slope. The frequency droop slope may define, specify, or otherwise identify a relationship between the frequency and the power level of the power signal 180. For example, the frequency droop slope may define a linear relationship between the active power component (P) and the frequency (F). With the detection of the transition in the power signal 180, the frequency droop control 145 may determine or identify the drooped frequency (F*, sometimes herein referred to as a reference frequency) based on the change in the active power component and the initial frequency. When discharging, the drooped frequency may be higher than the initial frequency. Conversely, when charging, the drooped frequency may be lower than the initial frequency. Upon identification, the frequency droop control 145 may send, relay, or otherwise provide the drooped frequency to other components of the controller 130, such as the supervisory control 155 and the phase control 165, among others.

(In conjunction, the amplitude droop control 150 executing on the controller 130 may retrieve, receive, or otherwise identify at least a portion of the power signal 180 from the power meter 140. The amplitude droop control 150 may be structured to be coupled with the power meter 130, in conjunction with the amplitude droop control 150 in the controller 130. In some embodiments, the amplitude droop control 150 may process the received power signal 180. The amplitude droop control 150 may receive or identify the reactive power component of the power signal 180 from the power meter 140. For instance, the reactive power component of the power signal 180 may be a measured inverter output reactive power converted into per unit (pu). Upon receipt, the amplitude droop control 150 may calculate, determine, or otherwise identify an initial voltage of the power signal 180, such as the initial voltage of the reactive power component. In some embodiments, the amplitude droop control 150 may identify the initial voltage for at least one component of a set of components in the domain for the voltage. For example, the amplitude droop control 150 may identify the direct (D) component of the dq0 domain for the voltage.

The amplitude droop control 150 may calculate, identify, or otherwise determine a drooped voltage for the power signal 180 using the initial voltage according to an amplitude droop slope. The amplitude droop slope may define, specify, or otherwise identify a relationship between the voltage and the power level of the power signal 180. For example, the amplitude droop slope may define a linear relationship between the reactive power component (Q) and the voltage amplitude (V). In some embodiments, the amplitude droop control 150 may determine the drooped voltage (V*), sometimes herein referred to as a reference voltage) for the selected component in the domain using the initial voltage in the same component in the domain (e.g., direct component in the dq0 domain). The voltages in the remaining components in the domain may remain unchanged (e.g., quadrature and zero components in the dq0 domain).

With the detection of the transition in the power signal 180, the amplitude droop control 150 may determine or identify the drooped voltage based on the change in the reactive power component and the initial voltage. When discharging, the drooped voltage may be lower than the initial voltage. Conversely, when charging, the drooped voltage may be higher than the initial voltage. Upon identification, the amplitude droop control 150 may send, forward, or otherwise provide the drooped voltage to other components in the controller 130, such at least one AC V/I control 160 and the supervisory control 155, among others.

In addition, the supervisory control 155 (sometimes herein referred to as secondary control layer) executing on the controller 130 may change, set, or otherwise modify the power signal 180 based on outputs of the power meter 140, the frequency droop control 145, and the amplitude droop control 150. The supervisory control 155 may be structured to be coupled with the power meter 140, the frequency droop control 145, and the amplitude droop control 150, among others. The supervisory control 155 may be structured to be coupled with the inverter 135 (e.g., via one or more other components of the power subsystem 105). The operations of the supervisory control 155 may depend on whether the power subsystem 105 is operating as a standalone or parallel on the electric bus 115. In some embodiments, the operations of the supervisory control 155 may depend on whether the power subsystem 105 is charging the DC power source 110 (or a battery coupled thereto) from the electric bus 115 or discharging onto the electric bus 115 from the DC power source 110.

The supervisory control 155 may form a secondary control layer different from a primary control layer including other components of the controller 130, such as the power meter 140, the frequency droop control 145, the amplitude droop control 150, the set of AC V/I controls 160, the phase control 165, the domain converter 170, and the modulator 175, among others. In some embodiments, the supervisory control 155 may process the received power signal 180 at a rate different from one or more of the components in the primary control layer 150. For example, the supervisory control 155 may process the power signal 180 and outputs from other components at rate of 400-600 Hz, whereas the frequency droop control 145 and the amplitude droop control 150 may process the received power signal 180 at a different rate (e.g., 12-18 kHz).

The supervisory control 155 may be configured to try to maintain a measured frequency at the AC bus/PCC to the desired frequency at the PCC, and the measured voltage at the AC bus/PCC to match the desired voltage at the PCC. In other words, the supervisory control 155 may command the center frequency f0 to compensate and maintain the measured frequency F at the PCC to match a desired frequency F_PCC* at the PCC. The supervisory control 155 may command the center voltage VO to compensate and maintain the measured voltage V at the PCC to match a desired voltage V_PCC* at the PCC. As discussed above, the changes in the frequency and voltage of the power signal 180 to the drooped frequency and the drooped voltage respectively may be the result of the occurrence of the transient in the power signal 180. The change in frequency with the drooped frequency and the change in voltage with the drooped voltage for the power signal 180 may result in power flow via the power subsystem 105, such as into the power subsystem 105 when charging and out from the power subsystem 105 and onto the electric bus 115 when discharging.

In addition, the supervisory control 155 may acquire, obtain, or otherwise identify the power signal 180 from the power meter 140. From the power signal 180, the supervisory control 155 may determine or identify the measured output active power component (P), the commanded output active power component (P*), measured reactive power component (Q), and the commanded output reactive power component (Q*), among others. The measured power components (P and Q) may be obtained from the output of the inverter 135 toward the electric bus 115. The measured power components (P and Q) may be obtained from the electric bus 115 toward the input of the inverter 135. The commanded power components (P* and Q*) may be obtained at the input of the inverter 135 from the other components of the controller 130 (e.g., AC V/I control 160). In addition, the supervisory control 155 may identify or determine the voltage and the frequency at the point of common coupling (PCC) between the inverter 135 and the electric bus 115. The voltage and frequency at the PCC may have been measured by the power meter 140.

When operating as standalone, the supervisory control 155 may calculate, identify, or otherwise determine a center frequency for the power signal 180 to maintain the frequency of the output electric power at the PCC between the inverter 135 and the electric bus 115. The determination of the center frequency may be based on the voltage frequency and the active power components (e.g., both measured and commanded). In addition, the supervisory control 155 may calculate, identify, or otherwise determine a center voltage for the power signal 180 to maintain the voltage of the output electric power at the PCC between the inverter 135 and the electric bus 115. The determination of the center voltage amplitude may be based on the voltage amplitude and the reactive power components (e.g., both measured and commanded).

With the determination of the center frequency and center voltage, the supervisory control 155 may change, set, or otherwise modify the power signal 180. As the power system 105 is operating as standalone, the power subsystem 105 may be discharging electric power from the DC power source 110 onto the electric bus 115 via the inverter 135. In modifying, the supervisory control 155 may alter, set, or modify the frequency of the power signal 180 from the drooped frequency to the center frequency to maintain the frequency at the PCC. In addition, the supervisory control 155 may alter, set, or modify the voltage of the power signal 180 from the drooped voltage to the center voltage to maintain the voltage at the PCC between the inverter 135 and the electric bus 115. The supervisory control 155 may send, forward, or otherwise provide the modified power signal 180.

When operating as parallel, the supervisory control 155 may enable, activate, or otherwise engage a power control loop to apply to the power signal 180 to be provided to the inverter 135. The supervisory control 155 may have at least one power control loop for the voltage and at least one power control loop for the frequency. Each power control loop of the supervisory control 155 may manage, regulate, or otherwise control the voltage or frequency in accordance with a proportional (P) and integral (I) controller. By default, the supervisory control 155 may have each control loop in a disabled, deactivated, or disengaged state, independent of whether the power subsystem 105 is operating in parallel or standalone. The supervisory control 155 may also initially set the output inverter power (including the active and reactive power component) for the power signal 180 to null.

When activated, the supervisory control 155 may change, set, or otherwise modify the voltage and the frequency of the power signal 180 in accordance with the power control loop. With the activation, the supervisory control 155 may modify, set, or otherwise configure the commanded output inverter power for the power signal 180 to a defined value. In some embodiments, the supervisory control 155 may set the commanded output active power component (P*) to the defined value and the commanded output reactive power component (Q*) to the defined value. The defined value for the power signal 180 may be initially set to null, and then set to a defined target value for the power flow between the inverter 135 and the electric bus 115. At this stage, the measured power including the active power component and the reactive power component may be set to another defined value (e.g., null).

Upon detection of the transition (e.g., coupling or uncoupling of a parallel power subsystem 105 on the electric bus 115), the supervisory control 155 may calculate, identify, or otherwise determine a center frequency for the power signal 180. The determination of the center frequency may be based on the voltage frequency and the active power components (e.g., both measured and commanded). In some embodiments, the center frequency may be determined to match the measured active power component with the commanded active power component for the electric power at the inverter 135. In some embodiments, the center frequency may be determined by the supervisory control 155 to match the electric power from the inverter 135 with the electric power on the electric bus 115 (e.g., from the parallel power source). For instance, the frequency of the voltage of electric power from the inverter 135 may match the frequency of the voltage of the electric power on the electric bus 115 at the PCC.

In addition, the supervisory control 155 may calculate, identify, or otherwise determine a center voltage for the power signal 180. The determination of the center voltage amplitude may be based on the voltage amplitude and the reactive power components (e.g., both measured and commanded). In some embodiments, the determination of the center voltage may be determined to match the measured reactive power component with the commanded reactive power component for the electric power at the inverter 135. In some embodiments, the center voltage may be determined by the supervisory control 155 to match the electric power from the inverter 135 with the electric power on the electric bus 115 (e.g., from the parallel power source). For instance, the amplitude of the voltage from the inverter 135 may match the amplitude of the voltage on the electric bus 115 at the PCC.

With the determination of the center frequency and center voltage, the supervisory control 155 may change, set, or otherwise modify the power signal 180. As the power system 105 is operating in parallel, the power subsystem 105 may be charging or discharging electric power from the DC power source 110 onto the electric bus 115 via the inverter 135. When charging, the supervisory control 155 may alter, set, or modify the frequency of the power signal 180 from the drooped frequency to the center frequency to initiate charging. In addition, the supervisory control 155 may alter, set, or modify the voltage amplitude of the power signal 180 from the drooped voltage to the center voltage also to initiate charging. When discharging, the supervisory control 155 may alter, set, or modify the frequency of the power signal 180 from the drooped frequency to the center frequency to maintain the frequency at PCC. In addition, the supervisory control 155 may alter, set, or modify the voltage of the power signal 180 from the drooped voltage to the center voltage to maintain the frequency between the inverter 135 and the electric bus 115 at PCC. The supervisory control 155 may send, forward, or otherwise provide the modified power signal 180. The modified power signal 180 may be for the conveyance of electric power between the inverter 135 and the electric bus 115.

At least one of the set of AC V/I controls 160 executing on the controller 130 may retrieve, identify, or otherwise receive at least a portion of the modified power signal 180 from the supervisory control 155. In some embodiments, the portion of the modified power signal 180 may be received via the amplitude droop control 150. The set of AC V/I controls 160 may be structured to be coupled with the amplitude droop control 150 and the supervisory control 155. The set of AC V/I controls 160 may correspond to a set of legs of the inverter 135, and may correspond to the set of voltage or current components in a domain (e.g., direct, quadrature, and zero components in the dq0 domain or in other domains). Each AC V/I control 160 may receive a corresponding component in the power signal 180 (e.g., d, q, or 0 component), and may process the component in accordance with at least one PI control loop (e.g., one loop for voltage and another loop for current). In some embodiments, at least one of the AC V/I controls 160 may use a defined value for the corresponding component (e.g., quadrature and zero components set to zero) and may process the component using the PI control loop. Each AC V/I control 160 may send, forward, or otherwise provide the output to the phase control 165.

The phase control 165 executing on the controller 130 may retrieve, identify, or otherwise receive the modified power signal 180. The phase control 165 may be structured to be coupled with the set of AC V/I controls 160 to receive the voltage components of the power signal 180. The phase control 165 may be structured to be coupled with the frequency droop 165 to receive the frequency component (e.g., drooped frequency) of the power signal 180. Based on the voltage and the frequency, the phase control 165 may determine a phase for the voltage to be conveyed between the inverter 135 and the electric bus 115. The phase may be determined to match the phase of the voltage at the inverter 135 with the phase of the voltage on the electric bus 115. In some embodiments, the phase control 165 may set at least one component of the voltage to a defined value to maintain the phase. For instance, the phase control 165 may set the quadrature and zero components to null to maintain the phase.

The domain converter 170 executing on the controller 130 may convert, transform, or otherwise transform the modified power signal 180 from one domain to another domain. The domain converter 170 may be structured to be coupled with the set of AC V/I controls 160 and the phase control 165 to retrieve, identify, or otherwise receive the modified power signal 180. Upon receipt, the domain converter 170 may determine or identify the domain (e.g., DQ0 domain) in which the power signal 180 is defined. The domain converter 170 may select or identify a target domain (e.g., ABC domain) to which to convert the power signal 180. With the identification, the domain converter 170 may perform the domain transformation from the original domain to the target domain. In performing, the domain converter 170 may calculate, generate, or otherwise determine the value for each component in the set of components in the target domain for the power signal 180. The power signal 180 in the target domain may include a value for each component (e.g., A-phase, B-phase, and C-phase).

The modulator 175 executing on the controller 130 may produce, output, or otherwise generate a set of gating signals 185A-N (hereinafter generally referred to gating signals 185) using the modified power signal 180. The modulator 175 may be structured to be coupled with the other components in the controller 130 (e.g., the domain converter 170) and the inverter 135. The set of gating signals 185 may be used to apply the commanded power (e.g., commanded active and reactive power components) to the inverter 135. Each gating signal 185 may be a pulse width modulated (PWM) signal to be provided to a corresponding leg of the inverter 135. The gating signals 185 may be used to direct or control the DC/AC conversion of the electric power conveyed between the DC power source 110 and the electric bus 115 through the inverter 135 when the power subsystem 105 is operating in parallel with other power sources on the electric bus 115. The gating signals 185 may also be used to set and direct the amount of power flow to be drawn through the inverter 135 by the loads 120 on the electric bus 115 when operating in standalone (e.g., no other power sources) on the electric bus 115.

The inverter 135 may obtain, accept, or otherwise receive the set of gating signals 185 from the modulator 175. The inverter 135 may be structured coupled with the modulator 175 to receive the set of gating signals 185. Using the gating signals 185, the inverter 135 may transform or convert the electrical power from AC to DC (e.g., using an active rectifier). In some embodiments, the inverter 135 can transform the electrical power from DC to AC. As discussed above, the electrical power may be passed through the power subsystem 105 in either direction. The inverter 135 may be electrically coupled between the DC power source 110 and the electric bus 115 in series configuration (e.g., as depicted) or parallel, or in any combination. The inverter 135 may be electrically coupled with the electric bus 115 in parallel with another power subsystem 105 (e.g., as depicted).

Upon conversion, the inverter 135 may convey, send, or otherwise provide the electrical power (e.g., in the form of AC) to the one or more loads 120 via the electric bus 115. The inverter 130 can include one or more components, such as an inverter and rectifier, and any combination thereof, to perform the DC to AC conversion. In some embodiments, the inverter 135 can feed forward or provide the AC electrical power corresponding to the set of gating signals 185 to the electric bus 115. The load 120 electrically coupled with the electric bus 115 can include or correspond to any component electrically coupled with the power subsystem 105 to use, spend, or otherwise consume the electrical power originating from the power subsystem 105. The load 120 can include, for example, analog electronics, computer devices, and electric vehicles, among others.

While the features are described as being performed by individual sub-components (e.g., the power meter 140, the frequency droop control 145, the amplitude droop control 150, the supervisory control 155, the set of AC V/I controls 160, the phase control 165, the domain converter 170, and the modulator 175 of the controller 130, among others), in various implementations the features may be performed by the processor and can be implemented via one or more of the other elements of memory or different elements. For example, the processor of the controller 130 (or the power subsystem 105) can execute instructions defining the power meter 140, the frequency droop control 145, the amplitude droop control 150, the supervisory control 155, the set of AC V/I controls 160, the phase control 165, the domain converter 170, and the modulator 175, among others as stored and maintained on the memory.

Figure 2A:
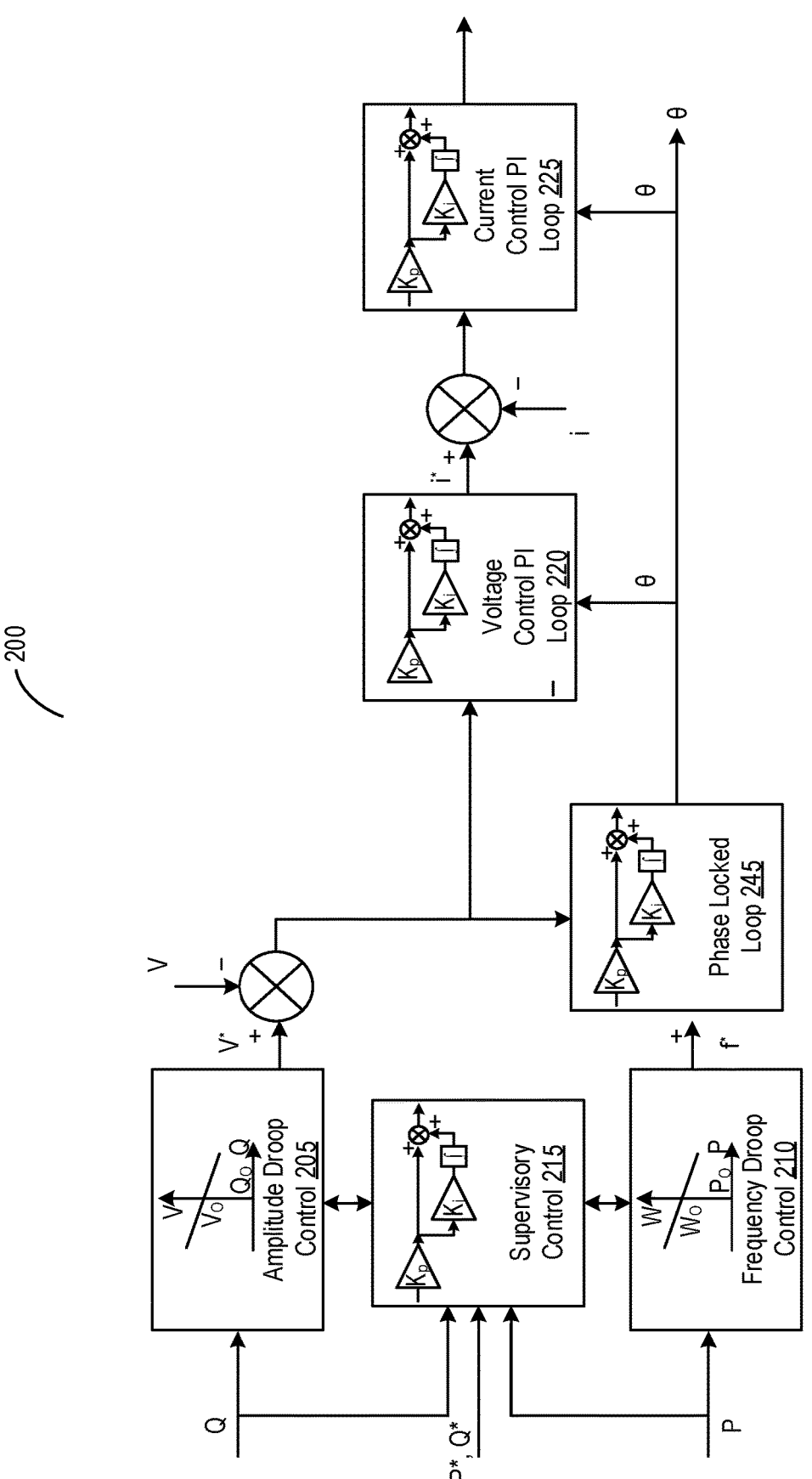
FIGS. 2A and 2B depict a circuit diagram of a power subsystem with paralleling inverter control in accordance with an illustrative embodiment.
Figure 2B:
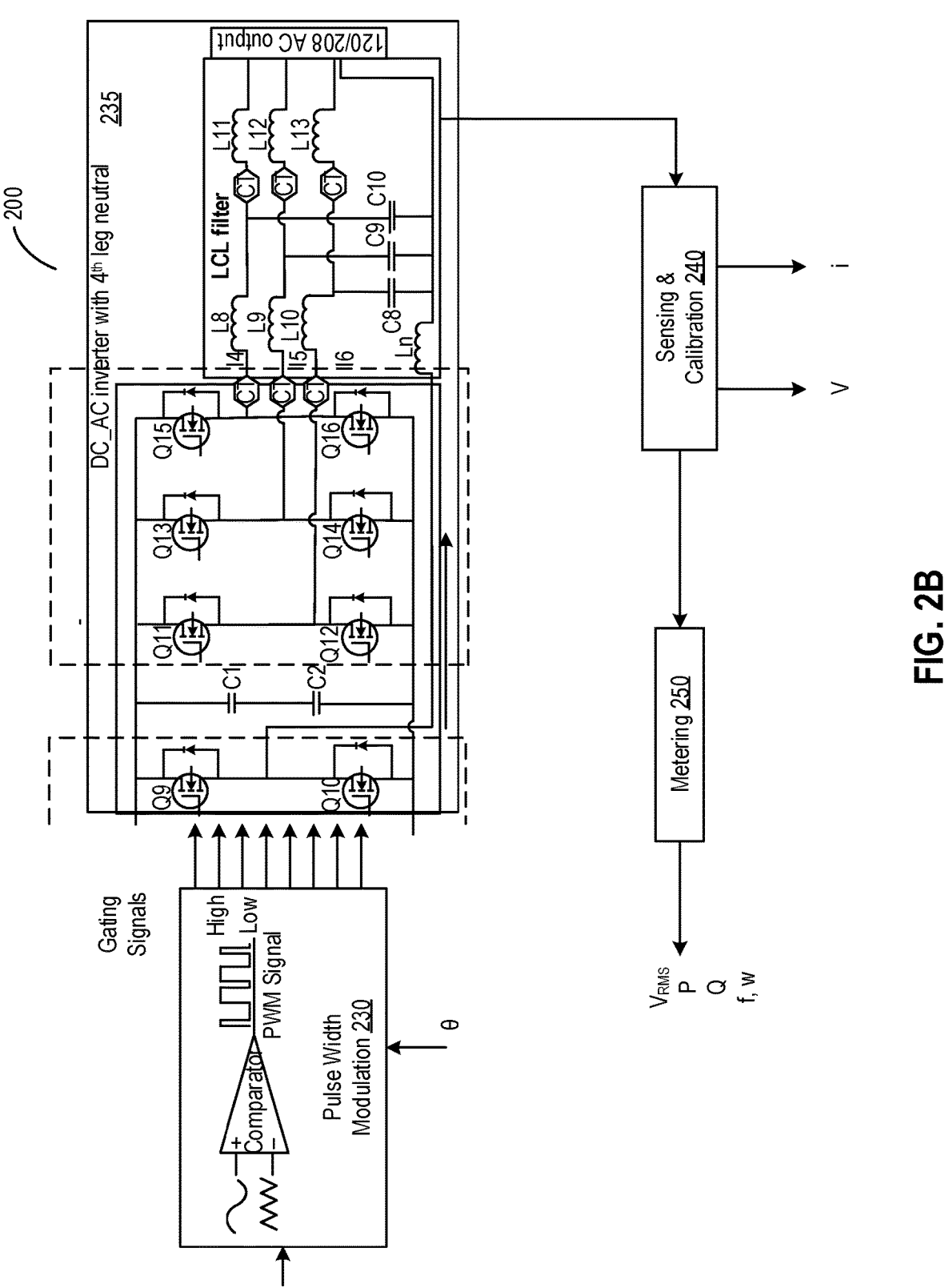

FIGS. 2A and 2B depict a circuit diagram of a power subsystem 200 with paralleling inverter control. The power subsystem 200 may be part of or can include one or more of the components in the system 100. Starting from FIG. 2A, the power subsystem 200 may include one or more components to receive direct current (DC) electrical power from a power source for conversion into alternating current (AC) electrical power to provide to components electrically coupled with the power system 200.

The power subsystem 200 may include at least one amplitude droop control 205 and at least one frequency droop control 210. The amplitude droop control 205 can modify or regulate an amplitude of a voltage of the electrical power received from the power source in accordance with a droop characteristic specified for the amplitude. The amplitude droop control 205 can feed the output forward to a voltage multiplier to modify (e.g., via multiplication with a configured input) the output voltage. The frequency droop control 210 can modify or regulate a frequency or phase of the electrical power in accordance with a droop characteristic specified for the frequency. The frequency droop control 210 can feed the output signal forward.

In addition, the power subsystem 200 may include at least one supervisory control 215. The supervisory control 215 may be configured to try to maintain a measured frequency at the AC bus/PCC to the desired frequency at the PCC, and the measured voltage at the AC bus/PCC to match the desired voltage at the PCC. In other words, the supervisory control 155 may command the center frequency f0 to compensate and maintain the measured frequency F at the PCC to match a desired frequency F_PCC* at the PCC. The supervisory control 155 may command the center voltage VO to compensate and maintain the measured voltage V at the PCC to match a desired voltage V_PCC* at the PCC. In addition, the supervisory control 215 may acquire, obtain, or otherwise identify the electrical power. From the electrical power, the supervisory control 155 may determine or identify the measured output active power component (P), the commanded output active power component (P*), measured reactive power component (Q), and the commanded output reactive power component (Q*), among others. Based on the measured and commanded output active power component, the supervisory control 215 may determine a new center voltage for the amplitude droop control 205 to use. Based on the measured and commanded output reactive power component, the supervisory control 215 may determine a new center frequency for the frequency droop control 210 to use. The supervisory control 215 may also alter the frequency and voltage of the power signal using the newly determined center voltage and frequency.

The power subsystem 200 may include at least one voltage control loop 220 (e.g., a proportional (P) and integral (I) type (PI-type) or a PI and derivative (D) type (PID-type), or P and resonant (R) type (PR-type)), at least one current control loop 225 (e.g., PI, PID, or PR types), at least one phase locked loop 245, among others. The voltage PI loop 220 can accept, obtain, or otherwise receive the output from the amplitude droop control 205. The voltage PI loop 220 can further regulate the voltage of the electrical power to output an inverter command signal. The voltage PI loop 220 can feed the output inverter command forward to the current multiplier to modify (e.g., via multiplication with a configured input) the output current. The current control PI loop 225 can accept, obtain, or otherwise receive the output from the voltage control PI loop 220. The current control PI loop 225 can further regulate the current of the electrical power. The current control PI loop 220 can produce, output, or otherwise generate an output inverter command signal.

The phase locked loop 245 may include, for example: at least one variable frequency oscillator, at least one filter, at least one phase detector, and at least one feedback loop to adjust the frequency to match the phase of the voltage of the electrical power via the inverter 235 with the phase of the voltage of the electric power on the electric bus. The phase locked loop 245 may provide a phase of the electrical power of the output.

Moving onto FIG. 2B, the power subsystem 200 may include at least one pulse width modulation unit 230 and at least one inverter 235. The pulse width modulation unit 230 can accept, obtain, or otherwise receive the output from the voltage control PI loop 220 and the current control PI loop 225. The output may include the inverter command converted from one domain (e.g., DQ0 domain) to a target domain (e.g., A-phase, B-phase, and C-phase). Using the inverter command, the pulse width modulation unit 230 can produce, output, or otherwise generate a set of gating signals. The pulse width modulation 230 can feed or provide the set of gating signals to a set of corresponding inputs or legs of the inverter 235.

The inverter 235 may accept, obtain, or otherwise receive the set of gating signals from the pulse width modulation unit 230. The inverter 235 can include a set of switch banks and at least one filter. The set of switch banks can correspond to the set of legs or inputs for the inverter 235, and can perform processing (e.g., DC to AC conversion) for the inverter 235. The filter can filter out or suppress harmonics of the current delivered or absorbed by the inverter 235 from reaching other components to which the electrical power is to be delivered. Using the set of gating signals, the inverter 235 may perform DC to AC conversion.

The power system 200 can include at least one sensing and calibration unit 240, and at least one metering unit 250, among others. The sensing and calibration unit 240 can provide instrumentation on the voltage and current of the electrical power of the output from the inverter 235. The metering unit 250 can gather other information about the electrical power of the output.

Figure 3:
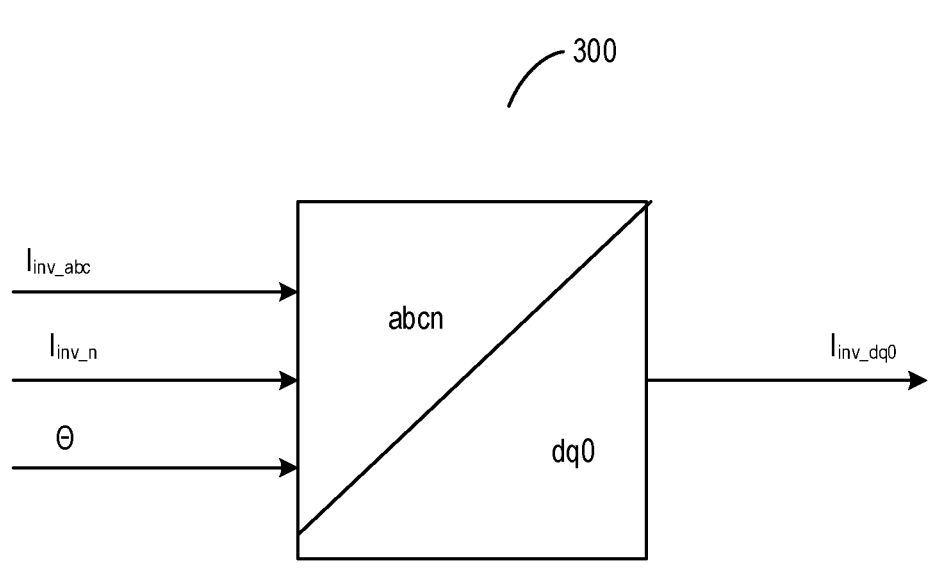
FIG. 3 depicts a block diagram of an input domain converter for current in a power subsystem with paralleling inverter control in accordance with an illustrative embodiment.

Referring now to FIG. 3, depicted is a block diagram of an input domain converter 300 for current in a power subsystem with paralleling inverter control. The input domain converter 300 may perform abcn domain to dq0 domain conversions for current. The input domain converter 300 may have: measured inverter-side currents for phases A, B, and C (Iinv_abc); measured inverter-side neutral current (Iinv_n); and voltage angle reference from the PLL (radians) (Θ) as inputs. Using the inputs, the input domain converter 300 may output measured inverter-side currents transformed to the d, q, and 0 axes (Iinv_dq0)

Figure 4:
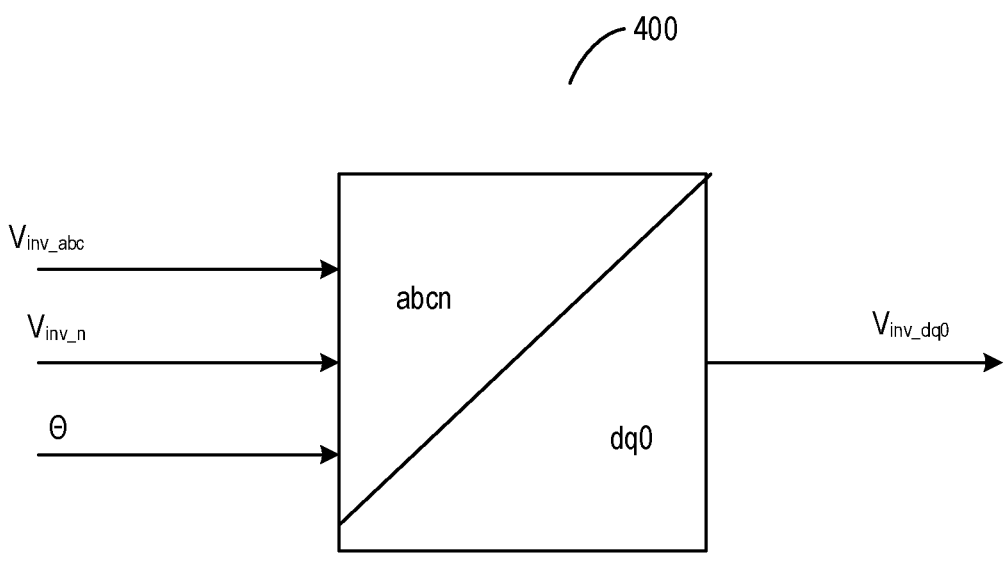
FIG. 4 depicts a block diagram of an input domain converter for voltage in a power subsystem with paralleling inverter control in accordance with an illustrative embodiment.

Referring now to FIG. 4, depicted is a block diagram of an input domain converter 400 for voltage in a power subsystem with paralleling inverter control. The input domain converter 400 may perform abcn domain to dq0 domain conversions for voltage. The input domain converter 400 may have: measured load- or grid-side voltages for phases A, B, and C (Vinv_abc); measured neutral voltage (Vinv_n), and voltage angle reference from the PLL (radians) (Θ) as inputs. Using the inputs, the input domain converter 400 may output measured load- or grid-side voltages transformed to the d, q, and 0 axes (Vinv_dq0).

Figure 5:
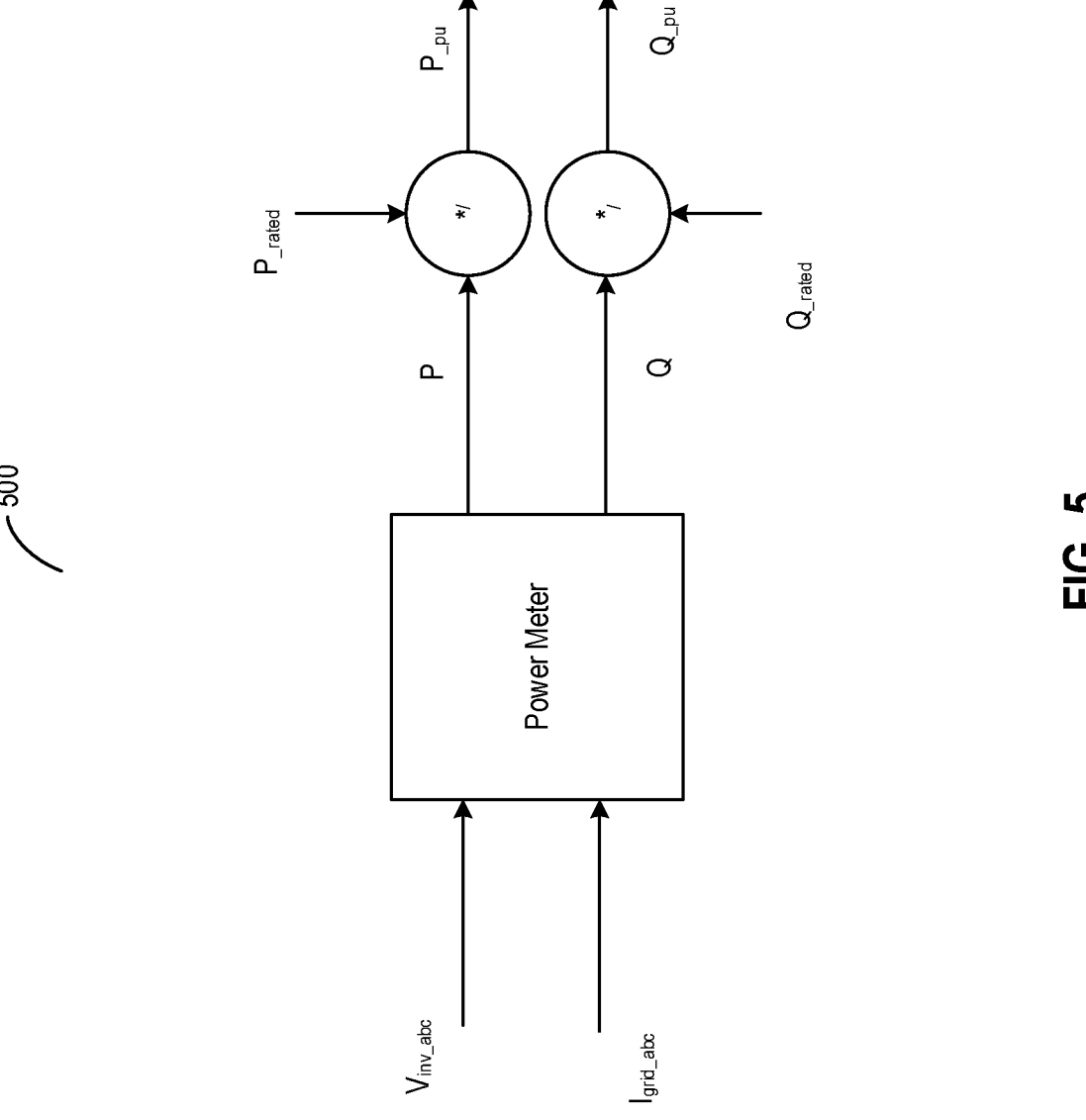
FIG. 5 depicts a block diagram of a power meter in a power subsystem with paralleling inverter control in accordance with an illustrative embodiment.

Referring now to FIG. 5, depicted is a block diagram of a power meter 500 in a power subsystem with paralleling inverter control. The power meter 500 may have measured grid-side currents for phases A, B, and C (Igrid_abc) and measured load- or grid-side voltages for phases A, B, and C (Vinv_abc) as inputs. In some embodiments, the power meter 500 may have measured in the dq0 domain for the inputs. Using the inputs, the power meter 500 may output measured inverter output active power (P) and measured inverter output reactive power (Q). In addition, the power meter 500 may use defined rated active power of the inverter (P_rated) and the output measured inverter output active power (P) to output measured inverter output active power converted into per unit (pu) (P_pu). The power meter 500 may use defined rated reactive power of the inverter (Q rated) and the output measured inverter output reactive power (Q) to output measured inverter output active power converted into per unit (pu) (Q_pu).

Figure 6:
FIG. 6 depicts a block diagram of a frequency droop control in a power subsystem with paralleling inverter control in accordance with an illustrative embodiment.
Figure 6:
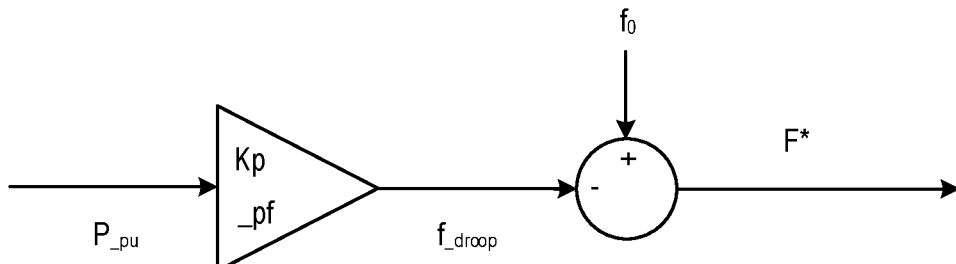

Referring now to FIG. 6, depicted is a block diagram of a frequency droop control 600 in a power subsystem with paralleling inverter control. The frequency droop control 600 may have measured inverter output active power converted into per unit (P_pu). The frequency droop control 600 may output the frequency-active power droop frequency offset (Hz) (f droop) in accordance with frequency-active power droop slope/gain (Kp_pf). With the output, the frequency droop control 600 may adjust the offset frequency using a commanded center frequency (Hz) (f0) to output a reference voltage frequency (Hz) (F*).

Figure 7:
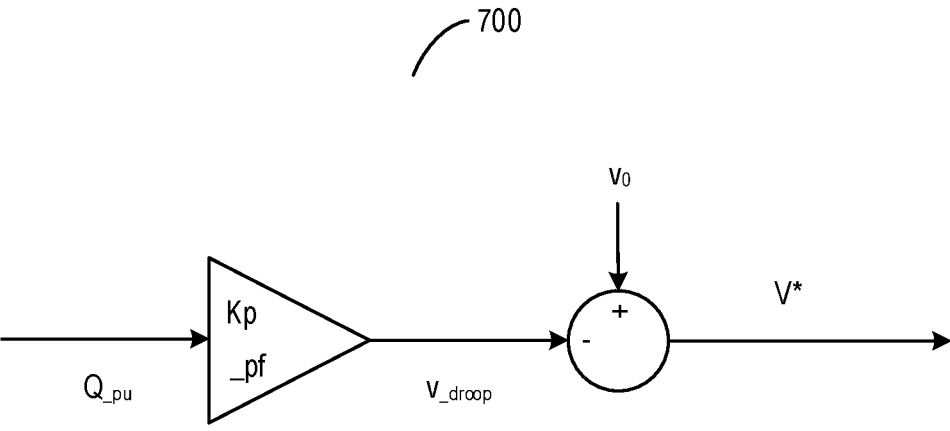
FIG. 7 depicts a block diagram of an amplitude droop control in a power subsystem with paralleling inverter control in accordance with an illustrative embodiment.

Referring now to FIG. 7, depicted is a block diagram of an amplitude droop control 700 in a power subsystem with paralleling inverter control. The voltage droop control 700 may have measured inverter output reactive power converted into per unit (Q_pu). The voltage droop control 700 may output the voltage-reactive power droop voltage offset (V) (V droop) in accordance with voltage-reactive power droop slope/gain (Kp_qv). With the output, the voltage droop control 700 may adjust the offset voltage using a commanded center voltage (v0) to output a reference voltage magnitude (V*).

Figure 8:
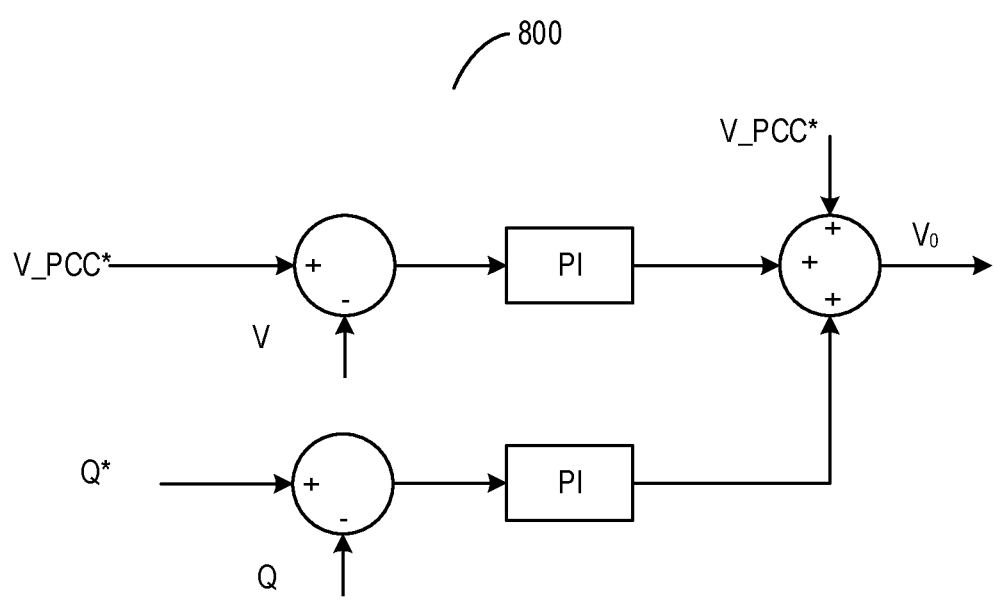
FIG. 8 depicts a block diagram of a supervisory control for voltage amplitude in a power subsystem with paralleling inverter control in accordance with an illustrative embodiment.

Referring now to FIG. 8, depicted is a block diagram of a supervisory control 800 for voltage amplitude in a power subsystem with paralleling inverter control. The supervisory control 800 for voltage may include: desired voltage magnitude at the PCC (V_PCC*); a measured voltage magnitude at the PCC (V); measured inverter output reactive power (VAr) (Q); commanded inverter output reactive power (VAr) (Q*); and desired voltage magnitude at the PCC (V) (V_PCC*). The supervisory control 800 may combine desired voltage magnitude at the PCC (V_PCC*) and a measured voltage magnitude at the PCC (V) and modify the resultant in accordance with a control (e.g., a PI, PID, or PR control). The supervisory control 800 may also combine the measured inverter output reactive power (VAr) (Q); commanded inverter output reactive power (VAr) (Q*), and modify the resultant in accordance with a control. The supervisory control 800 may aggregate the resultants from the two controls and adjust the aggregated value to match the desired voltage magnitude at the PCC (V) (V_PCC*) and the desired commanded inverter output reactive power (VAr) (Q*) to be absorbed and/or delivered to the AC electric bus to output a commanded center voltage (V) (VO).

Figure 9:
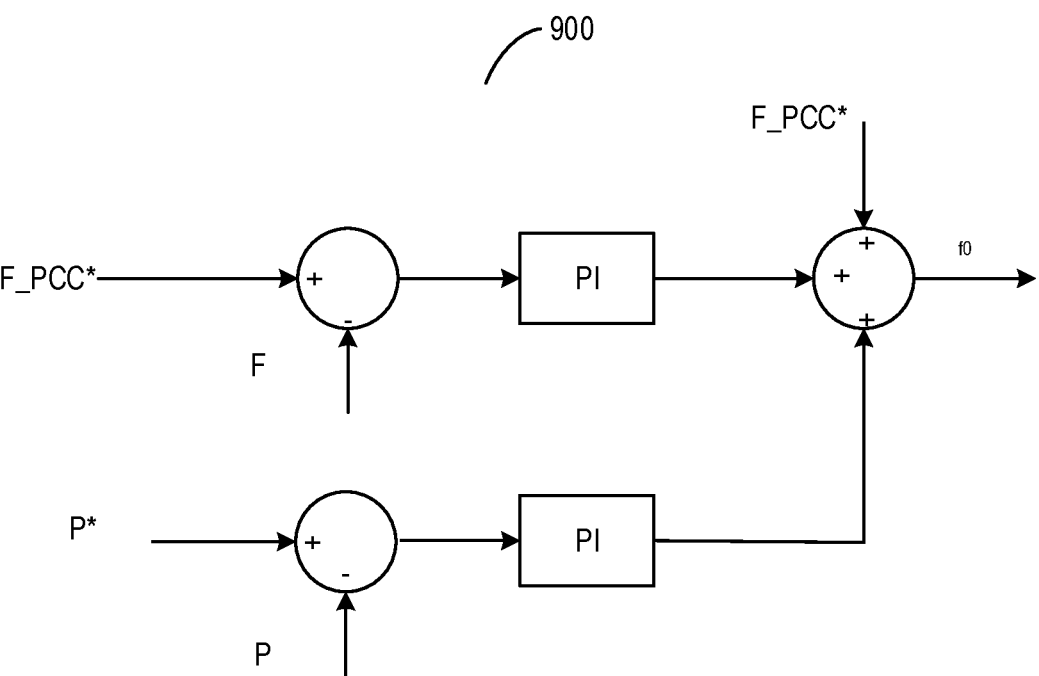
FIG. 9 depicts a block diagram of a supervisory control for voltage frequency in a power subsystem with paralleling inverter control in accordance with an illustrative embodiment.

Referring now to FIG. 9, depicted is a block diagram of a supervisory control 900 for voltage frequency in a power subsystem with paralleling inverter control. The supervisory control 900 for frequency in a power subsystem with paralleling inverter control. The supervisory control 900 for frequency may include: desired voltage frequency at the PCC (F_PCC*); a measured voltage frequency at the PCC (F); measured inverter output active power (W) (P); commanded inverter output active power (W) (P*); and desired voltage frequency at the PCC (F) (F_PCC*). The supervisory control 900 may combine desired voltage frequency at the PCC (F_PCC*) and a measured voltage frequency at the PCC (F) and modify the resultant in accordance with a control. The supervisory control 900 may also combine the measured inverter output active power (W) (P); commanded inverter output active power (W) (P*), and modify the resultant in accordance with a control. The supervisory control 900 may aggregate the resultants from the two PI controls and adjust the aggregated value to match the desired voltage frequency at the PCC (Hz) (F_PCC*) and the desired commanded inverter output active power (W) (P*) to be absorbed and/or delivered to the AC electric bus to output a commanded center frequency (Hz) (FO).

Figure 10:
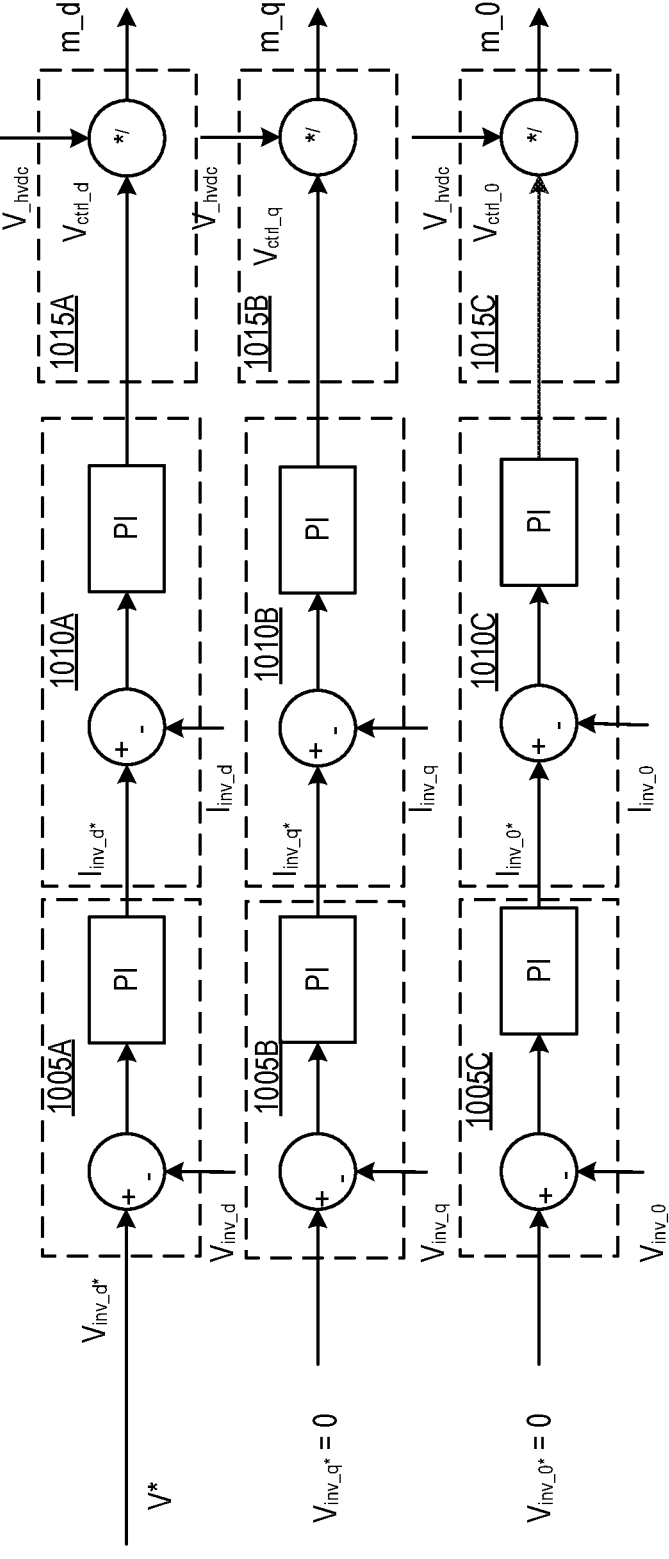
FIG. 10 depicts a block diagram of a set of controls for AC voltage and current in a power subsystem with paralleling inverter control in accordance with an illustrative embodiment.

Referring now to FIG. 10, depicted is a block diagram of a AC voltage and current control system 1000 for voltage and current in a power subsystem with paralleling inverter control. The control system 1000 may have a set of voltage controls 1005A-C, a set of current controls 1010A-C, and a set of scaling controls 1015A-C. Each set may correspond to a set of components (e.g., dq0 components) in a domain and by extension a set of legs of a power inverter to convert electric power from DC to AC and vice versa. At least one voltage control 1005A may have the reference voltage magnitude (V*) as an input, and the remaining voltage controls 1005B and 1005C may have a defined value (e.g., null) as the reference voltage. Each voltage control 1005 may have a measured load-side voltage (e.g., measured d-axis grid/load-side voltage (Vinv_d), measured q-axis grid/load-side voltage (Vinv_q), and measured zero-axis grid/load-side voltage (Vinv_0)) as input. Each voltage control 1005 may use a respective control loop (e.g., PI, PID, or PR types) to modify and regulate the respective voltage.

Continuing on, each current control 1010 may have a commanded inverter-side current (e.g., commanded d-axis inverter-side current (Iinv_d*), commanded q-axis inverter-side current (Iinv_q*), and commanded zero-axis inverter-side current (Iinv_0*)) and a measured inverter-side current (e.g., measured d-axis inverter-side voltage (Iinv_d), measured q-axis inverter-side voltage (Iinv_q), and measured zero-axis inverter-side voltage (Iinv_0)) as input. Each current control 1010 may use a respective control loop to modify and regulate the respective current. Each scaling control 1015 may have a control voltage on a current control loop output (e.g., d-axis control voltage (Vctrl_d), q-axis control voltage (Vctrl_q), and 0-axis control voltage (Vctrl_0)) and measured high voltage DC bus voltage (V) (V_hvdc)) as inputs. Each scaling control 1015 may output a respective duty cycle (e.g., d-axis duty cycle (m_d), q-axis duty cycle (m_q), and zero-axis duty cycle (m_0)).

Figure 11:
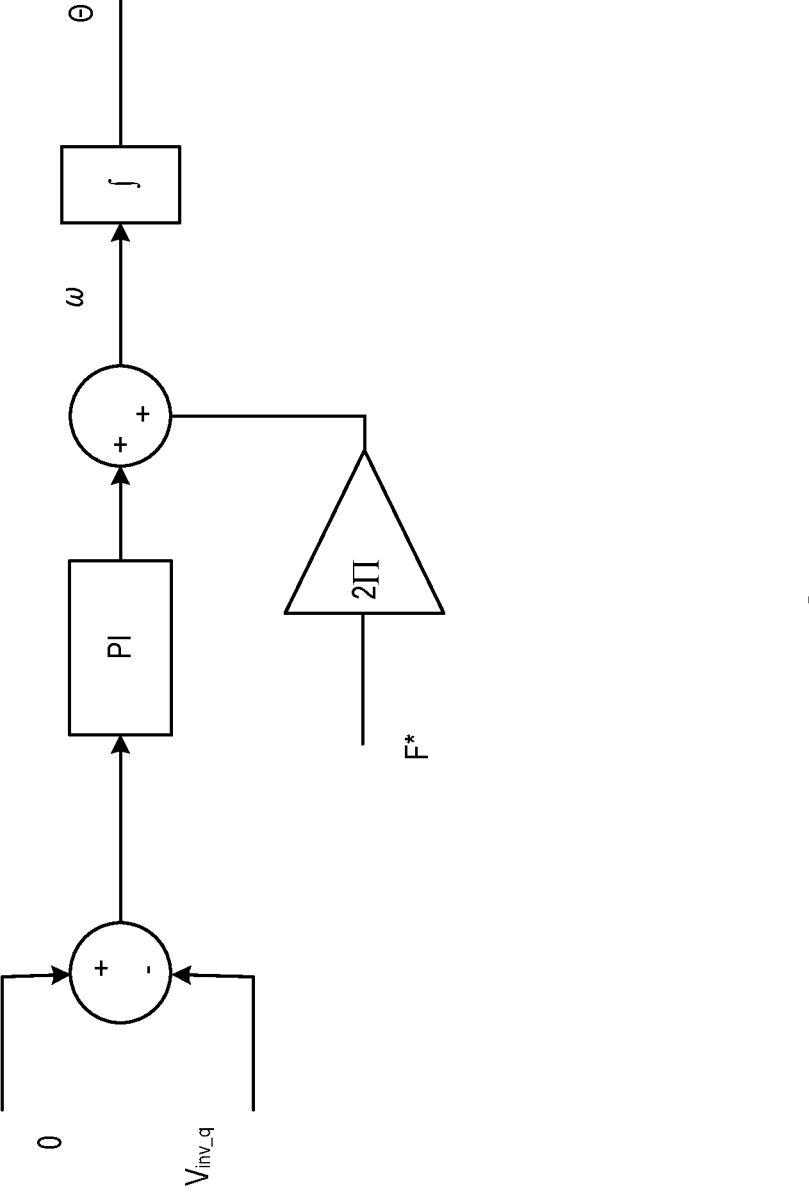
FIG. 11 depicts a block diagram of a phase control in a power subsystem with paralleling inverter control in accordance with an illustrative embodiment.

Referring now to FIG. 11, depicted is a block diagram of a phase control 1100 in a power subsystem with paralleling inverter control. The phase control 1100 may include measured q-axis grid/load-side voltage (V) (Vinv_q) and a reference voltage (e.g., 0) as an input to a control loop. In addition, the phase control 1100 may have a reference voltage frequency (F*) as an input. By combining resultants, the phase control 1100 may generate voltage frequency reference from the phase lock loop (PLL) (radians/second) (ω). The phase control 1100 may use an integrator on the voltage frequency reference from the PLL to output voltage angle reference from the PLL (radians) (Θ).

Figure 12:
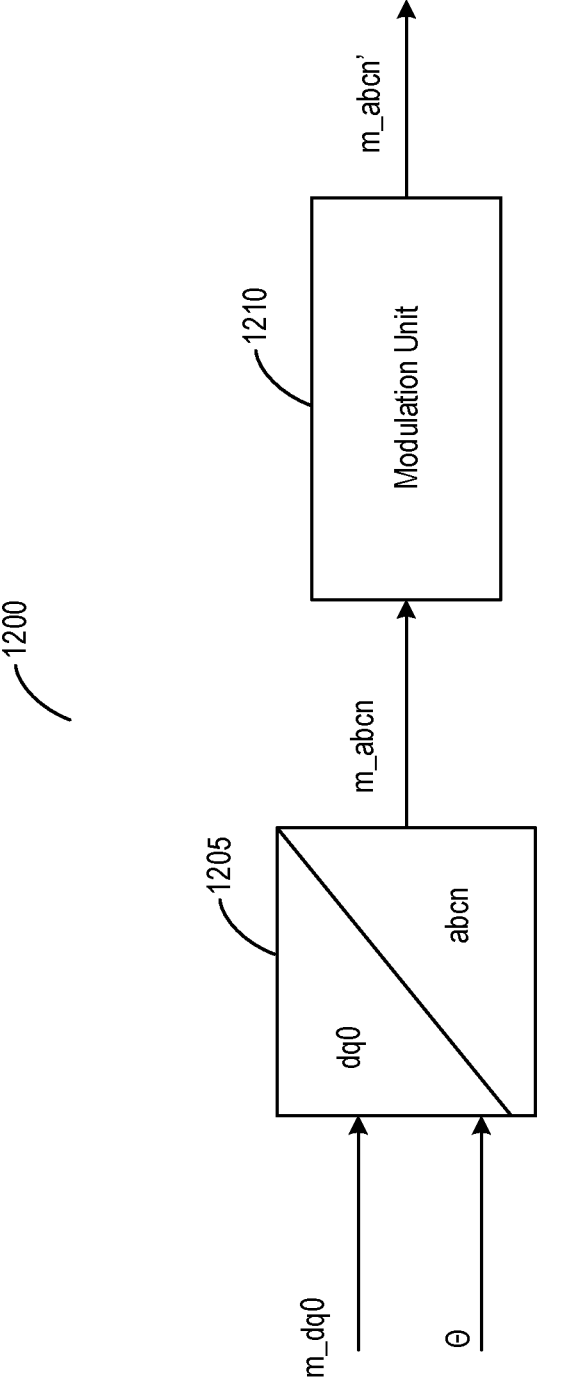
FIG. 12 depicts a block diagram of an output unit in a power subsystem with paralleling inverter control in accordance with an illustrative embodiment.

Referring now to FIG. 12, depicted is a block diagram of an output unit 1200 in a power subsystem with paralleling inverter control. The output unit 1200 may have at least one domain transformer 1205 and at least one modulation unit 1210. The domain transformer 1205 may have d, q and 0 axes duty cycles (m_dq0) and voltage angle reference from the PLL (radians) (Θ) as inputs, and may output duty cycles transformed for the A, B, C and neutral leg (unitless) (m_abcn) to feed to the modulation unit 1210. The modulation unit 1210 in turn may generate A, B, C and neutral leg duty cycles after post processing (unitless) (m_abcn').

Figure 13:
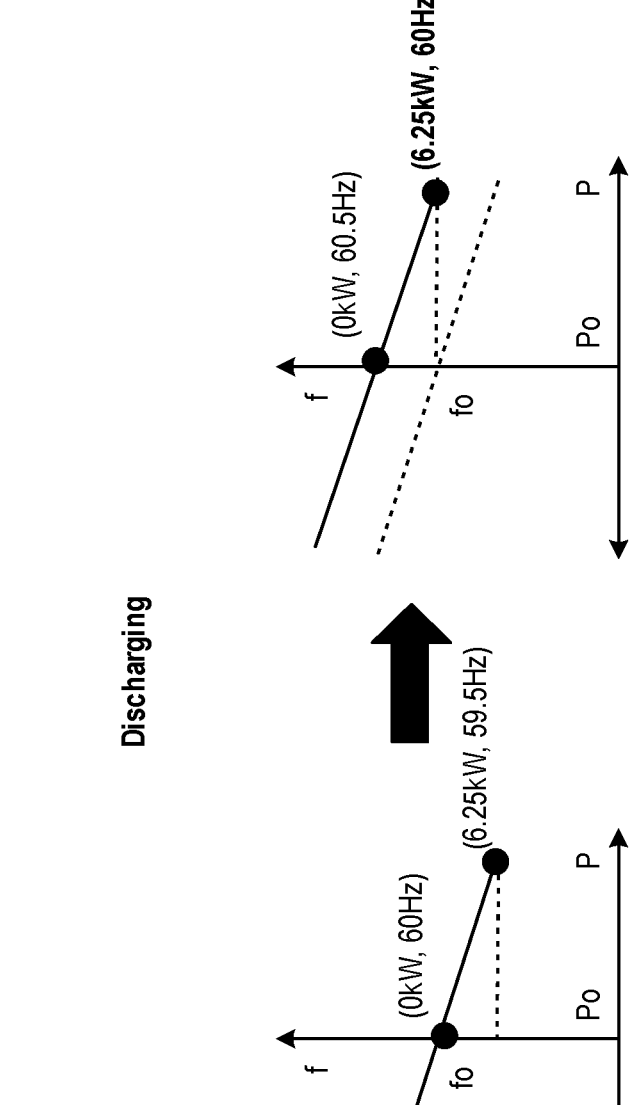
FIG. 13 depicts a graph of frequency and active power in a discharging scenario in accordance with an illustrative embodiment.

Referring now to FIG. 13, depicted is a graph 1300 of frequency and active power in a standalone discharging scenario. In the graph 1300, upon discharging from the power subsystem to a load connected to the AC electric bus in standalone, the droop control of the power subsystem may droop the frequencies according to the P/F droop slope from 0 kW, 60 Hz to 6.25 kW, 59.5 Hz. To maintain the electric frequency at 60 Hz, the supervisory control of the power subsystem may change the center frequency of the power signal as shown to 60.5 Hz. Similarly, upon discharging from the power subsystem to a load connected to the AC electric bus in standalone, the droop control of the power subsystem may droop the voltages according to the Q/V droop slope from 0 kVAr, 120 VRMS to 4.69 kVAr, 118.2 VRMS. To maintain the electric voltage at 120 VRMS, the supervisory control of the power subsystem may change the center voltage of the power signal to 121.8 VRMS.

Figure 14:
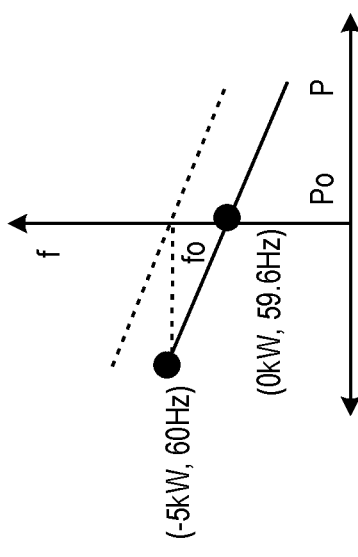
FIG. 14 depicts a graph of frequency and active power in a charging scenario in accordance with an illustrative embodiment.
Figure 14:
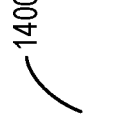
Figure 14:
Figure 14:
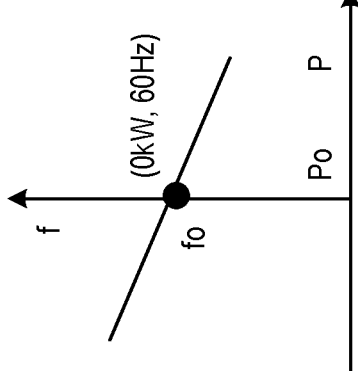

Referring now to FIG. 14, depicted is a graph 1400 of frequency and active power in a paralleled charging scenario. In the graph 1400, upon charging of the power subsystem from a live electric bus, an AC power source or another power subsystem connected to the AC electric bus in parallel, the supervisory control may change the center frequency to 59.6 Hz to initiate charging active power P (kW) power flow of 5 kW. The droop control of the power subsystem may droop the frequencies in accordance with the P/F droop slope from 0 kW, 59.6 Hz to –5 kW, 60 Hz to maintain the electric frequency at 60 Hz, therefore initiating charging active power P (kW) power flow of 5 kW.

Similarly, upon charging of the power subsystem from a live electric bus, an AC power source or another power subsystem connected to the AC electric bus in parallel, the supervisory control may change the center voltage to 118.08 VRMS to initiate charging reactive power Q (kVAr) power flow of 5 kVAr. The droop control of the power subsystem may droop the voltages in accordance with the Q/V droop slope from 0 kVAr, 118.08 VRMS to –5 kVAr, 120 VRMS to maintain the electric voltage at 120 VRMS, therefore initiating charging reactive power Q (kVAr) power flow of 5 kVAr.

Furthermore, upon discharging of the power subsystem to a live electric bus, an AC power source or another power subsystem connected to the AC electric bus in parallel, the supervisory control may change the center frequency and center voltage to initiate discharging active power P (kW) power flow and reactive power Q (kVAr) power flow respectively. The droop control of the power subsystem may droop the frequencies and voltages in accordance with the P/F droop slope and Q/V droop slope respectively, therefore initiating discharging active power P (kW) power flow and reactive power Q (kVAr) power flow respectively.

Figure 15:
FIG. 15 depicts a flow diagram of a method for regulating electric power in accordance with an illustrative embodiment.
Figure 15:
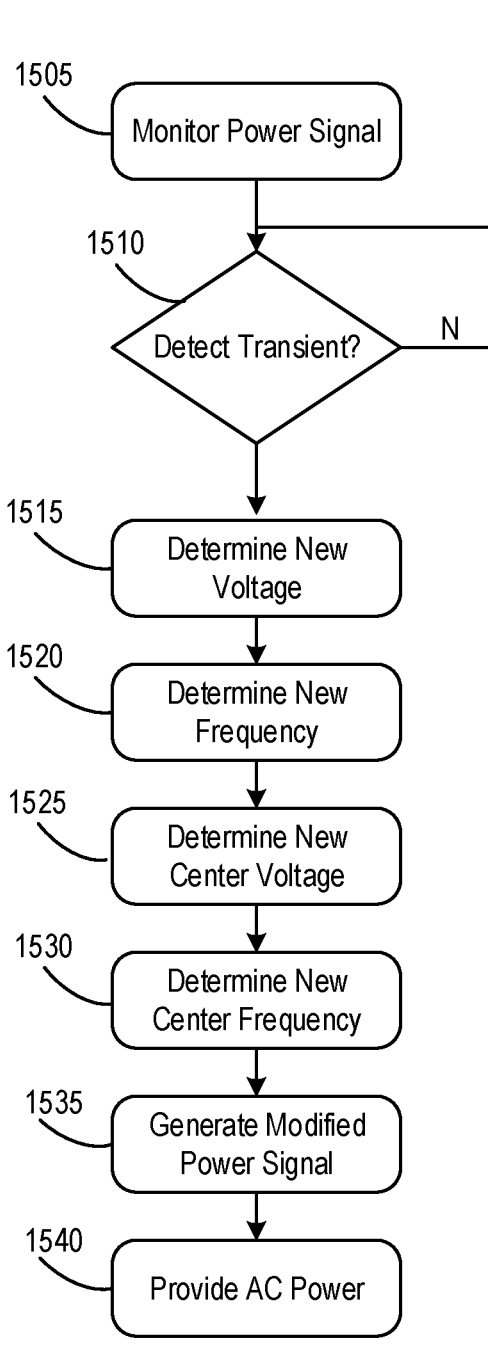

Referring now to FIG. 15, depicted is a flow diagram of a method 1500 for regulating electric power. The method 1500 can be implemented by or performed using any of the components discussed herein. In brief overview, under the method 1500, a controller may monitor a power signal (1505). The controller may detect whether a transient is present in the power signal (1510). The controller may determine a new voltage (1515). The controller may determine a new frequency (1520). The controller may determine a new center voltage (1525). The controller may determine a new center frequency (1530). The controller may generate a modified power signal (1535). The controller may provide an alternating current (AC) electric power (1540). While shown in the depicted order, the steps of the method 1500 can occur in any sequence or order on in partial concurrence with one another. For example, steps (1515)-(1535) may occur in any order or in partial concurrence.

In further detail, a controller (e.g., the controller 130) may monitor a power signal (e.g., the power signal 180) (1505). The power signal may correspond to electrical power to be conveyed between an inverter (e.g., the inverter 135) and an AC electric bus (e.g., the electric bus 115). The power signal may be defined in terms of or otherwise have a voltage (V), a current (I), power (V×I), frequency (f), and a phase (Θ), among others. In some embodiments, the controller may determine an active power component (P) and a reactive power component (Q) from the power signal.

The controller may identify, determine, or otherwise detect whether a transient is present in the power signal (1510). The transient may correspond to: (i) charging to draw the AC electric power from the AC electric bus to convert via the inverter for storage; (ii) discharging to output the AC electric power from a DC power source via the inverter onto the AC electric bus, among others. The controller may monitor for changes in value of power, including the active power component and the reactive power component. If there is a change in the value of power, the controller may detect the presence of the transient. Otherwise, if there is no change, the controller may continue monitoring.

Once the transient (e.g., charging or discharging) is detected, the controller may calculate, identify, or otherwise determine a new center voltage (1525). The new center voltage may be generated by a supervisory control (e.g., the supervisory control 155) for an amplitude droop control (e.g., the amplitude droop control 150). The new center voltage may correspond to an amplitude of the voltage of the power signal (e.g., defined in terms of VRMS). The new center voltage may be to maintain the voltage of the power signal at a point of common coupling (PCC) between the inverter and the AC electric bus. The new center voltage may be to provide electric power at a target power flow level (e.g., for the reactive power component). The controller may engage a power control loop and/or voltage amplitude control loop to set the new center voltage.

In conjunction, the controller may calculate, identify, or otherwise determine a new center frequency (1530). The new center frequency may be generated by the supervisory control for a frequency droop control (e.g., the frequency droop control 145). The new center frequency may correspond to a frequency of the voltage of the power signal. The new center frequency may be to maintain the frequency of the power signal at the PCC between the inverter and the AC electric bus. The new center frequency may be to provide electric power at a target power flow level (e.g., for the active power component). The controller may engage a power control loop and/or voltage frequency control loop to set the new center frequency.

The controller may calculate, identify, or otherwise determine a new center voltage (1525). The new center voltage may be generated by the supervisory control for the amplitude droop control. The new center voltage may correspond to an amplitude of the voltage of the power signal (e.g., defined in terms of VRMS). The new center voltage may be to match the output electric power at the PCC or to initiate charging or discharging. The matched voltage for the electric power may be defined by the parallel power source. In addition, the controller may determine a new center frequency (1530). The new center frequency may be generated by the supervisory control for the frequency droop control. The new center frequency may be to match the output electric power at the PCC or to initiate charging or discharging. The matched frequency for the electric power may be defined by the parallel power source.

The controller may output, produce, or otherwise generate a modified power signal (1535). Using the center voltage and new voltage, the controller may determine the voltage for the modified power signal. Furthermore, based on the center frequency and new frequency, the controller may determine the frequency for the modified power signal. In some embodiments, the controller may modify a phase of the modified power signal to match the electric power at the PCC. The controller may convey, relay, or otherwise provide an alternating current (AC) electric power (1540). When charging, the controller may provide the AC electric power flowing from the AC electric bus to charge an internal power storage. Conversely, when discharging, the controller may provide the AC electric power flowing out onto the AC electric bus to discharge from the power source.

While this specification contains various implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub-combination. Moreover, although features may be described as acting in certain combinations and even initially claimed as such, one or more features from a claimed combination can, in some cases, be excised from the combination, and the claimed combination may be directed to a sub-combination or variation of a sub-combination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, exhaust gas, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values herein are inclusive of their maximum values and minimum values unless otherwise indicated. Furthermore, a range of values does not necessarily require the inclusion of intermediate values within the range of values unless otherwise indicated.

It is important to note that the construction and arrangement of the various systems and the operations according to various techniques shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

What is claimed is:

1. A device for parallel control, comprising:
a non-transitory computer-readable medium having instructions stored thereon; and
at least one processor configured to execute the instructions to:
monitor for a transition including a threshold amount of change in a first power signal corresponding to electrical power conveyed between an inverter and an electric bus, the first power signal having a power and a first frequency;
identify, responsive to detecting the transition in the first power signal, a second frequency in accordance with the transition in the first power signal and a frequency droop slope;

modify the first power signal using the second frequency to generate a second power signal to maintain the power; and
provide the second power signal to convey the electrical power between the inverter and the electric bus.

2. The device of claim 1, wherein the at least one processor is configured to execute the instructions to:
identify, responsive to identifying the transition as an initiation of discharging onto the electric bus, a voltage for the second power signal in accordance with a voltage droop slope; and
modify the first power signal to maintain the first frequency and the voltage at a point of common coupling (PCC) between the inverter and the electric bus to generate the second power signal.

3. The device of claim 1, wherein the at least one processor is configured to execute the instructions to:
determine, responsive to identifying the transition as an initiation of charging from the electric bus, a voltage for the second power signal to maintain the power; and
modify the first power signal to change the first frequency to a third frequency and the voltage to generate the second power signal for the charging from the electric bus.

4. The device of claim 1, wherein the at least one processor is configured to execute the instructions to:
identify a voltage component from a plurality of voltage components corresponding to a voltage of the first power signal; and
set the voltage component to a defined value to maintain a phase of the electrical power.

5. The device of claim 1, wherein the at least one processor is configured to execute the instructions to:
identify, responsive to identifying the transition as a coupling of a second power source parallel to the inverter, the second frequency to match electrical power from the second power source; and
modify the first power signal to change the first frequency to the second frequency to generate the second power signal for conveyance of the electrical power between the inverter and the electric bus.

6. The device of claim 1, wherein the at least one processor is configured to execute the instructions to:
identify, responsive to identifying the transition as a coupling of a second power source parallel to the inverter, a voltage to match electrical power from the second power source; and
modify the first power signal to set the voltage to generate the second power signal for conveyance of the electrical power between the inverter and the electric bus.

7. The device of claim 1, wherein the at least one processor is configured to execute the instructions to monitor for the transition comprising at least one of: charging from the electric bus, discharging onto the electric bus, or a coupling of a power source parallel to the inverter.

8. A system for providing electrical power, comprising:
a power source configured to provide the electrical power;
an inverter structured to be coupled with the power source to convey the electrical power to an electric bus;
a power meter structured to be coupled with the inverter and the electric bus, the power meter configured to identify a first power signal of the electrical power having a power and a first voltage;
an amplitude droop control structured to be coupled with the power meter, the amplitude droop control configured to determine, responsive to detecting a transition including a threshold amount of change in the first power signal, a second voltage in accordance with an amplitude droop slope; and a supervisory control structured to be coupled with the amplitude droop control and the inverter, the supervisory control configured to modify the first power signal using the second voltage to generate a second power signal to maintain the power to provide to the electric bus.

9. The system of claim 8, further comprising a frequency droop control structured to be coupled with the power meter and the supervisory control, the frequency droop control parallel to the amplitude droop control relative to the supervisory control, the frequency droop control configured to determine, responsive to the transition, a frequency in accordance with a frequency droop slope, and wherein the supervisory control is structured to be coupled with the frequency droop control, the supervisory control configured to determine a center frequency to modify the frequency of the first power signal to maintain the power.

10. The system of claim 8, wherein the power meter is further configured to:

determine, from the first power signal, an active power component and a reactive power component; and provide the reactive power component to the amplitude droop control and the active power component to a frequency droop control.

11. The system of claim 8, further comprising a phase control configured to set a voltage component of a plurality of voltage components corresponding to the first power signal, to null to maintain a phase of the electrical power.

12. The system of claim 8, further comprising a phase control configured to modify the first power signal using a frequency determined in accordance with a frequency droop slope, to generate the second power signal to maintain a phase of the electrical power.

13. The system of claim 8, wherein the power meter is further configured to determine, responsive to the transition, a type of the transition as one of charging from the electric bus, discharging onto the electric bus, or a coupling of a parallel power source; and wherein the supervisory control is further configured to modify the first power signal to generate the second power signal based on the type of the transition.

14. The system of claim 8, wherein the power source comprises at least one of a battery pack, a generator set, a renewable energy source, a microgrid, a power interface coupled with an external component.

15. A method of regulating electrical power, comprising:

identifying, by a processor, a threshold amount of change in a first power signal corresponding to the electrical power conveyed between an inverter and an electric bus;

calculating, by the processor, responsive to the threshold amount of change, a center frequency of the first power signal in accordance with a frequency droop slope to maintain the electrical power;

generating, by the processor, a second power signal using the first power signal and the center frequency in response to the threshold amount of change; and providing, by the processor, the second power signal to the inverter to convey electrical power between the inverter and the electric bus.

16. The method of claim 15, wherein calculating further comprises calculating, responsive to identifying the threshold amount of change as a start of discharging onto the electric bus, a center voltage in accordance with an amplitude droop slope, and wherein generating further comprises generating the second power signal to maintain the center frequency and the center voltage for the electrical power.

17. The method of claim 15, wherein calculating further comprises calculating, responsive to identifying the threshold amount of change as a start of charging from the electric bus, a center voltage in accordance with an amplitude droop slope, and wherein generating further comprises generating the second power signal to change the center frequency and the center voltage for the electrical power.

18. The method of claim 15, further comprising selecting, by the processor, a voltage component from a plurality of voltage components corresponding to the electrical power; and wherein generating further comprises generating the voltage component of the second power signal in accordance with an amplitude droop slope, without changing a remaining components of the plurality of voltage components.

19. The method of claim 15, further comprising identifying, by the processor, from the first power signal, an active power component and a reactive power component, and wherein generating further comprises generating the second power signal using the reactive power component modified in accordance with a frequency droop control and the active power component modified in accordance with an amplitude droop control.

20. The method of claim 15, wherein identifying further comprises monitoring for the threshold amount of change corresponding to at least one of: charging from the electric bus, discharging onto the electric bus, or a coupling of another power source parallel to the inverter.

* * * * *